(12) United States Patent
Matsuo et al.

(10) Patent No.: US 12,483,002 B2
(45) Date of Patent: Nov. 25, 2025

(54) SEMICONDUCTOR LASER DEVICE

(71) Applicant: NICHIA CORPORATION, Anan (JP)

(72) Inventors: Hidenori Matsuo, Hadano (JP);
Masaki Omori, Toshima-ku (JP)

(73) Assignee: NICHIA CORPORATION, Anan (JP)

(*) Notice: Subject to any disclaimer, the term of this patent is extended or adjusted under 35 U.S.C. 154(b) by 735 days.

(21) Appl. No.: 17/844,474

(22) Filed: Jun. 20, 2022

(65) Prior Publication Data
US 2022/0416502 A1 Dec. 29, 2022

(30) Foreign Application Priority Data

Jun. 23, 2021 (JP) .................. 2021-103877

(51) Int. Cl.
H01S 5/02326 (2021.01)
H01S 5/02255 (2021.01)
H01S 5/02315 (2021.01)
H01S 5/40 (2006.01)

(52) U.S. Cl.
CPC ...... H01S 5/02326 (2021.01); H01S 5/02255 (2021.01); H01S 5/02315 (2021.01); H01S 5/4012 (2013.01)

(58) Field of Classification Search
CPC ............. H01S 5/02326; H01S 5/02255; H01S 5/02315; H01S 5/4012; H01S 3/0675; H01S 3/094003; H01S 3/1613; H01S 5/02216; H01S 5/0222; H01S 5/32341; H01S 5/02251; H01S 5/02325; H01S 5/02423; H01S 3/06716; H01S 3/0941; H01S 5/02208; H01S 5/02253; H01S 5/4087
See application file for complete search history.

(56) References Cited

U.S. PATENT DOCUMENTS

| | | | |
|---|---|---|---|
| 7,733,932 B2 | 6/2010 | Faybishenko | |
| 8,891,579 B1 * | 11/2014 | Price | H01S 5/4025 372/50.12 |
| 9,413,136 B1 | 8/2016 | Vethake et al. | |

(Continued)

FOREIGN PATENT DOCUMENTS

| | | |
|---|---|---|
| JP | 2006-066875 A | 3/2006 |
| JP | 2014-170888 A | 9/2014 |

(Continued)

Primary Examiner — Xinning(Tom) Niu
(74) Attorney, Agent, or Firm — Foley & Lardner LLP

(57) ABSTRACT

A semiconductor laser device includes: a support base having a plurality of mounting surfaces arranged in a first direction, wherein heights of the mounting surfaces from a reference plane that is parallel to the first direction decrease stepwise or gradually along the first direction; a first semiconductor laser element secured to a first mounting surface; a second semiconductor laser element secured to a second mounting surface; a first slow-axis collimator lens secured to the first mounting surface, the first slow-axis collimator lens being located at a position at which the first laser light is incident; a second slow-axis collimator lens directly or indirectly secured to the second mounting surface, the second slow-axis collimator lens being located at a position at which the second laser light is incident; and a first sealing cover that defines an inner space in which the first and second semiconductor laser elements are held.

16 Claims, 14 Drawing Sheets

(56) References Cited

U.S. PATENT DOCUMENTS

| | | | |
|---|---|---|---|
| 2006/0018609 A1* | 1/2006 | Sonoda | G02B 6/4204 |
| | | | 385/94 |
| 2006/0251144 A1* | 11/2006 | Nagano | G02B 6/4204 |
| | | | 372/108 |
| 2009/0045219 A1* | 2/2009 | Helf | A61L 9/14 |
| | | | 222/402.21 |
| 2009/0245315 A1* | 10/2009 | Faybishenko | G02B 6/4214 |
| | | | 372/50.12 |
| 2012/0002293 A1* | 1/2012 | Du | H01S 5/02326 |
| | | | 359/629 |
| 2015/0380896 A1 | 12/2015 | Kimura et al. | |
| 2016/0285232 A1 | 9/2016 | Reinert et al. | |
| 2019/0157835 A1 | 5/2019 | Ishige et al. | |
| 2019/0196204 A1* | 6/2019 | Pierer | H01S 5/02255 |

FOREIGN PATENT DOCUMENTS

| | | |
|---|---|---|
| JP | 2017-103271 A | 6/2017 |
| JP | 2021-022665 A | 2/2021 |
| JP | 2021-506100 A | 2/2021 |
| JP | 2021-114503 A | 8/2021 |
| WO | WO-2018/043752 A1 | 3/2018 |
| WO | WO-2019/089983 A1 | 5/2019 |
| WO | WO-2021/039386 A1 | 3/2021 |
| WO | WO-2021/112248 A1 | 6/2021 |

* cited by examiner

SEMICONDUCTOR LASER DEVICE

CROSS-REFERENCE TO RELATED APPLICATION

This application claims priority to Japanese Patent Application No. 2021-103877, filed on Jun. 23, 2021, the entire contents of which are hereby incorporated by reference.

BACKGROUND

The present disclosure relates to a semiconductor laser device.

In recent years, with increase in the power of semiconductor laser elements (also referred to as "laser diodes"), the technique of using a semiconductor laser element as a light source of laser beams for directly irradiating materials for processing rather than as a pumping light source has been studied. Such a technique is referred to as Direct Diode Laser (DDL) technique.

U.S. Pat. No. 7,733,932 discloses an example of a laser light source in which a plurality of laser beams emitted from a plurality of semiconductor laser elements are combined to increase the light output. Combining of a plurality of laser beams may be referred to as "spatial beam combining" and can be utilized, for example, to increase the light output of the pumping light source of fiber laser devices, DDL devices and the like.

SUMMARY

There is a demand for a semiconductor laser device in which the volume of the space for sealing a plurality of semiconductor laser elements can be reduced.

According to one embodiment of the present disclosure, a semiconductor laser device includes: a support base having a plurality of mounting surfaces arranged in a first direction, a height of the plurality of mounting surfaces from a reference plane that is parallel to the first direction decreasing stepwise or gradually along the first direction; a first semiconductor laser element directly or indirectly secured to a first mounting surface included in the plurality of mounting surfaces, the first semiconductor laser element being configured to emit first laser light in a second direction that intersects with the first direction in a plan view from a normal direction of the reference plane; a second semiconductor laser element directly or indirectly secured to a second mounting surface included in the plurality of mounting surfaces, the second semiconductor laser element being configured to emit second laser light in the second direction in the plan view; a first slow-axis collimator lens directly or indirectly secured to the first mounting surface, the first slow-axis collimator lens being provided at a position at which the first laser light is incident; a second slow-axis collimator lens directly or indirectly secured to the second mounting surface, the second slow-axis collimator lens being provided at a position on which the second laser light is incident; and a first sealing cover having a lateral wall surrounding the first semiconductor laser element and the second semiconductor laser element, a lower end of the lateral wall being bonded to the support base, and the first sealing cover defining an inner space in which the first semiconductor laser element and the second semiconductor laser element are held, the first sealing cover having a light-transmitting region configured to transmit the first laser light and the second laser light. Each of the plurality of mounting surfaces includes a first region covered with the first sealing cover and a second region located outside the first sealing cover.

According to an embodiment of the present disclosure, a semiconductor laser device can be provided in which the volume of the space for sealing a plurality of semiconductor laser elements can be reduced.

DETAILED DESCRIPTION

The First Embodiment

Figure 1:
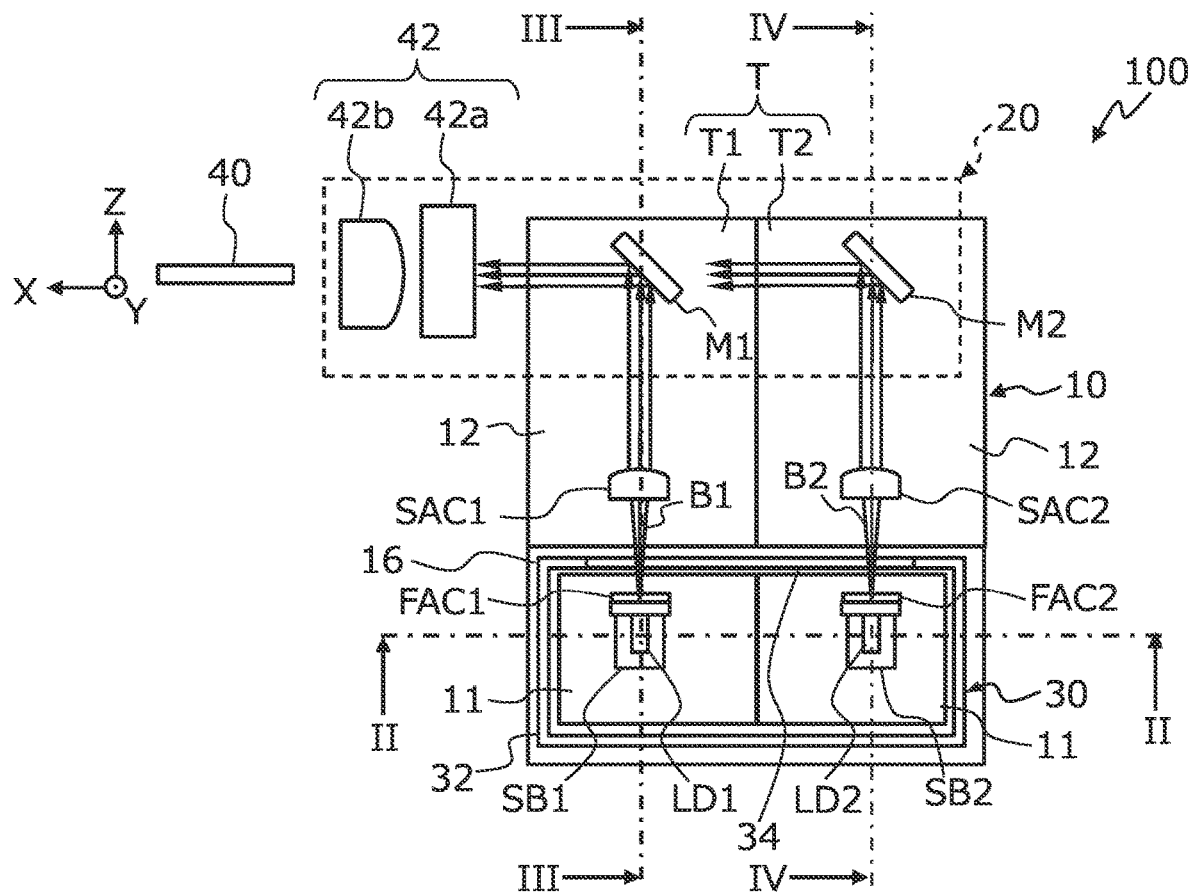
FIG. 1 is a top view showing a basic configuration example of a semiconductor laser device in the first embodiment of the present disclosure.

FIG. 1 is a diagram showing a basic configuration example of a semiconductor laser device 100 of the present embodiment.

Figure 2:
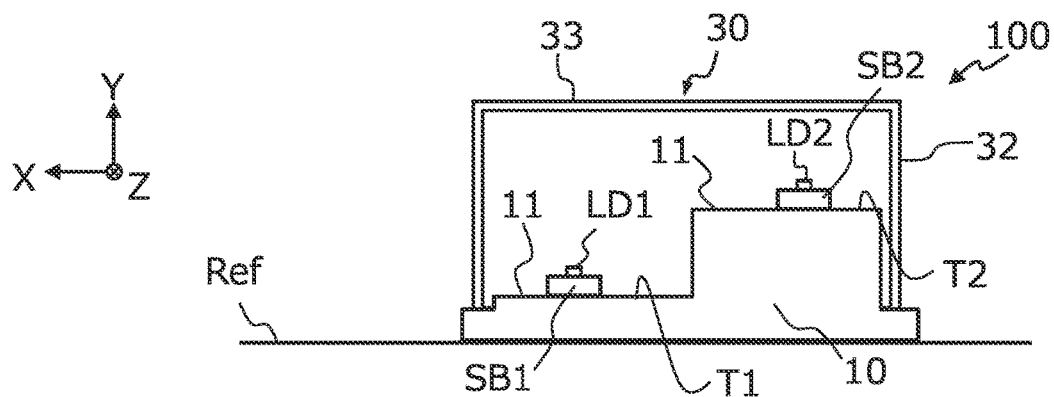
FIG. 2 is a schematic cross-sectional view of the semiconductor laser device taken along line II-II of FIG. 1.
Figure 3:
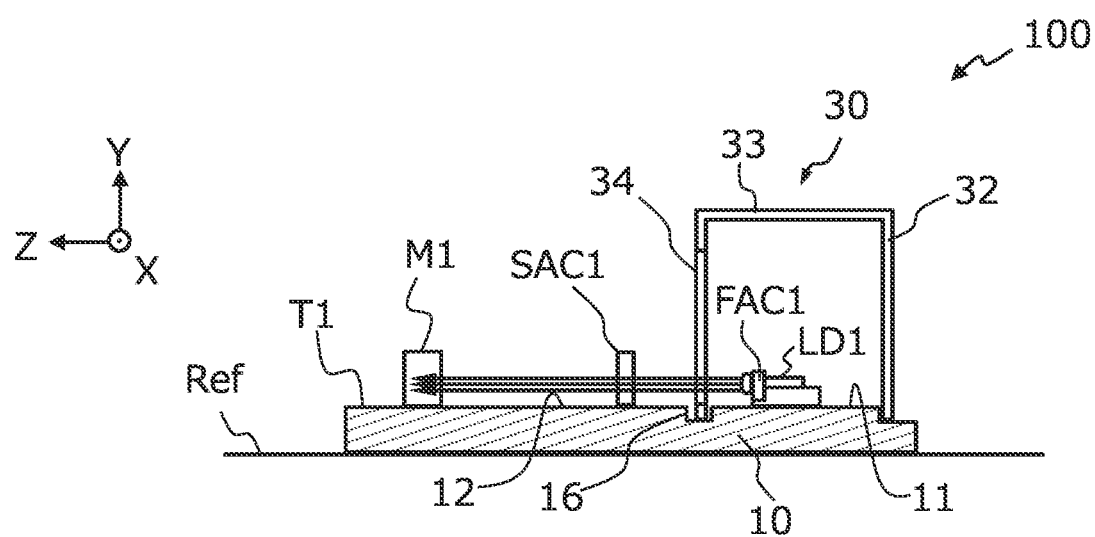
FIG. 3 is a schematic cross-sectional view of the semiconductor laser device taken along line of FIG. 1.
Figure 4:
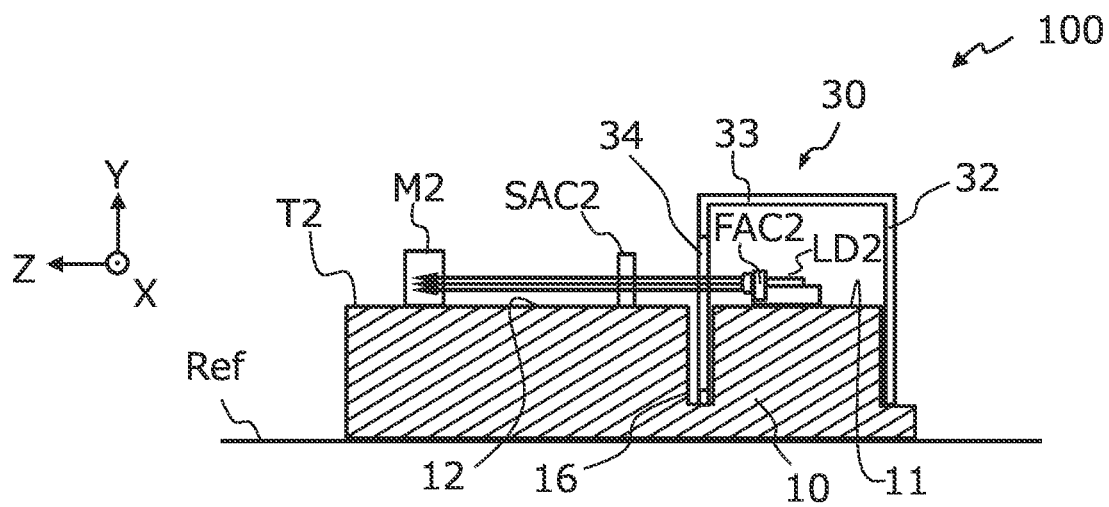
FIG. 4 is a schematic cross-sectional view of the semiconductor laser device taken along line IV-IV of FIG. 1.

FIG. 1 illustrates a schematic top view of the semiconductor laser device 100 as viewed from the normal direction of the XZ plane. However, FIG. 1 shows a top view of the semiconductor laser device 100 in a state in which a top surface part 33 of a first sealing cover 30, which will be described later, has been removed. FIG. 2 is a schematic cross-sectional view of the semiconductor laser device 100 taken along line II-II of FIG. 1. FIG. 3 is a schematic cross-sectional view of the semiconductor laser device 100 taken along line of FIG. 1. FIG. 4 is a schematic cross-sectional view of the semiconductor laser device 100 taken along line IV-IV of FIG. 1.

In the illustrated example, the semiconductor laser device 100 includes a support base 10, a first semiconductor laser element LD1, a second semiconductor laser element LD2, a first slow-axis collimator lens SAC1, a second slow-axis collimator lens SAC2, a first fast-axis collimator lens FAC1, a second fast-axis collimator lens FAC2, and a first sealing cover 30. In the present disclosure, a plurality of members, parts or elements generically indicated with "Z" can also be indicated with "Z1", "Z2", . . . , when they are distinguished from one another. For example, a plurality of semiconductor laser elements as a group can be generically referred to as "LD." When the semiconductor laser elements are distinguished from one another, they are referred to as "LD1", "LD2", . . . . The same also applies to the other members.

The beam cross-sectional shape of laser light emitted from an end surface of a semiconductor laser element LD is asymmetrical about the center axis of the beam. In a beam cross-sectional shape at a position distant from the end surface of the semiconductor laser element LD (far field pattern), the size in the semiconductor growth direction of the semiconductor laser element LD is greater than the size in a direction perpendicular to the semiconductor growth direction of the semiconductor laser element LD. Accordingly, the semiconductor growth direction is referred to as a "fast-axis direction," and a direction perpendicular to the direction of the fast-axis is referred to as a "slow-axis direction." However, because the laser beam can be reflected by a mirror such that the traveling direction can change, the terms "fast-axis direction" and "slow-axis direction" in the present disclosure are not necessarily parallel to a "Y-axis direction" and an "X-axis direction," respectively, in a global XYZ coordinate system, but rather depend on the asymmetry of the beam quality of each laser beam.

The fast-axis collimator lens FAC collimates laser light emitted from the end surface of the semiconductor laser element LD with respect to the fast-axis direction. The slow-axis collimator lens SAC collimates laser light emitted from the end surface of the semiconductor laser element LD with respect to the slow-axis direction. The fast-axis collimator lens FAC and the slow-axis collimator lens SAC are both cylindrical lenses (e.g., cylindrical planoconvex lenses). The cylindrical lens has a curved surface to converge a parallel bundle of rays onto an imaginary straight line (focal point). The curved surface has a shape corresponding to a portion of the outer peripheral surface of a circular cylinder, with a curvature of zero in a direction corresponding to an axial direction of the corresponding circular cylinder. In this specification, the beam cross-sectional size is defined by the size of a region that has a light intensity of $1/e^2$ or more relative to the peak power of the light intensity at the beam center. Herein, e is Napier's constant (about 2.71).

The support base 10 has a plurality of mounting surfaces T arranged in the first direction (the positive direction of the X axis). Although the support base 10 in the illustrated example has two mounting surfaces T, the support base 10 may have three or more mounting surfaces T. In the present disclosure, one of the plurality of mounting surfaces T is referred to as "first mounting surface T1", and another one is referred to as "second mounting surface T2". In the illustrated example of the support base 10, the height of the plurality of mounting surfaces T, specifically the height of the plurality of mounting surfaces T from the reference plane Ref (see FIG. 2) that is parallel to the first direction, decreases stepwise along the first direction. In other words, there is a step between adjacent mounting surfaces T. The reference plane Ref is an imaginary plane that is parallel to the XZ plane. In the illustrated example, each of the plurality of mounting surfaces T is parallel to the reference plane Ref. So long as the plurality of mounting surfaces T are parallel to each other, it is not necessary that each of the mounting surfaces T is strictly parallel to the reference plane Ref. In this specification, the phrase "the plurality of mounting surfaces T are parallel to each other" involves a case in which one of the mounting surfaces is inclined by ±0.1 degrees in the rotational direction around the X axis with respect to the other mounting surface. It is preferable that the inclination of one of the mounting surfaces in the rotational direction around the X axis with respect to the other mounting surface is not more than ±0.02 degrees. The phrase "the plurality of mounting surfaces T are parallel to each other" also encompasses a case in which one of the mounting surfaces is inclined by ±0.5 degrees or less in the rotational direction around the Z axis with respect to the other mounting surface. It is preferable that the inclination of one of the mounting surfaces in the rotational direction around the Z axis with respect to the other mounting surface is not more than ±0.1 degrees. In other embodiments, the height of the plurality of mounting surfaces T may gradually decrease along the first direction. In such a case, the entirety of the plurality of mounting surfaces T can be formed by a sloped surface that is not parallel to the reference plane Ref.

The first semiconductor laser element LD1 is directly or indirectly secured to the first mounting surface T1 included in the plurality of mounting surfaces T. The first semiconductor laser element LD1 is arranged to emit first laser light B1 in the second direction (the positive direction of the Z axis), which intersects with the first direction (the positive direction of the X axis), in a plan view from the normal direction of the reference plane Ref (from the positive direction toward the negative direction of the Y axis). In this example, the first direction and the second direction are perpendicular to each other, although they do not need to be perpendicular to each other. The second semiconductor laser element LD2 is directly or indirectly secured to the second mounting surface T2 included in the plurality of mounting surfaces T. The second semiconductor laser element LD2 is arranged so as to emit second laser light B2 in the second direction in the aforementioned plan view. In the present disclosure, the phrase "member X" is "directly or indirectly secured" to "any of the plurality of mounting surfaces T" means that "at least one other member Y" may be present or may not be present between "member X" and "any of the plurality of mounting surfaces T." In this plan view, each of the mounting surfaces T has a rectangular shape elongated in parallel with the second direction. However, the shape of each of the mounting surfaces T is not limited to this example but may be a parallelogrammatic or trapezoidal shape of which one interior angle is different from 90 degrees.

The mounting surfaces T of the support base 10 may be provided with an interconnection structure for supplying an electric current from an external circuit for driving the first semiconductor laser element LD1 and the second semiconductor laser element LD2. The interconnection structure can include interconnection elements such as an interconnection layer provided inside the support base 10 or on the mounting surfaces T, a wire directly or indirectly supported by the support base 10, a terminal electrode, and an electric conductor lead. A part or an entirety of the interconnection structure may be provided in the first sealing cover 30. The first semiconductor laser element LD1 and the second semiconductor laser element LD2 are connected in series or in parallel with an external driving circuit.

The support base 10 can be made of, for example, a ceramic material such as aluminum nitride, silicon nitride, aluminum oxide, silicon carbide, or the like, or a metal material that exhibits better heat dissipation than ceramic materials, such as copper, aluminum, silver, or the like. Alternatively, the support base 10 may be made of a metal matrix composite material that contains a metal material, such as copper, aluminum or silver, and diamond particles dispersed therein. The support base 10 may be an assembly of a plurality of parts. The plurality of parts can be made of different materials. The support base 10 is preferably made of a metal material such as copper, aluminum or silver and is preferably realized by a single member. The metal materials exhibit better heat dissipation than the ceramic materials and are ductile and hence can be easily processed. Inside the support base 10, one or a plurality of fluid channels may be provided for water cooling. At the surface of the support base 10, a fin structure may be provided for air cooling. Thus, in the present embodiment, the support base 10 can function not only as a support onto which a plurality of semiconductor laser elements LD are mounted, but also as a heat spreader or heat sink that radiates the heat generated by the plurality of semiconductor laser elements LD such that an excessive increase in temperature of the semiconductor laser elements LD can be suppressed.

The first slow-axis collimator lens SAC1 is directly or indirectly secured to the first mounting surface T1 and is provided at a position on which the first laser light B1 is incident. The second slow-axis collimator lens SAC2 is directly or indirectly secured to the second mounting surface T2 and is provided at a position on which the second laser light B2 is incident. The first slow-axis collimator lens SAC1 can be secured to the first mounting surface T1 via, for example, an adhesive agent. Likewise, the second slow-axis collimator lens SAC2 can also be secured to the second mounting surface T2 via an adhesive agent. Examples of the adhesive agent can include Au paste, Ag paste, Cu paste, AuSn solder, resin, Ag nanoparticles, and solder foil.

The first sealing cover 30 includes a lateral wall 32 surrounding the first semiconductor laser element LD1 and the second semiconductor laser element LD2 and a top surface part 33. Specifically, the shape of the first sealing cover 30 can have a lateral wall 32 that has four faces and a top surface part 33 that closes the opening at the upper end of the lateral wall 32. The top surface part 33 may be made of the same material as the lateral wall 32 and integrally connected with the lateral wall 32.

Alternatively, the top surface part 33 and the lateral wall 32 may be produced as separate parts and assembled. When the top surface part 33 and the lateral wall 32 are separate parts, the top surface part 33 may be referred to as a "lid". The first sealing cover 30 can be made of, for example, a ceramic or metal material. The lateral wall 32 and the top surface part 33 may be made of the same material or may be made of different materials.

The lower end of the lateral wall 32 of the first sealing cover 30 is bonded to the support base 10. The first sealing cover 30 defines the inner space in which the first semiconductor laser element LD1 and the second semiconductor laser element LD2 are held and includes a light-transmitting region 34 configured to transmit the first laser light B1 and the second laser light B2. The light-transmitting region 34 is provided between the first and second semiconductor laser elements LD1 and LD2 and the first and second slow-axis collimator lenses SAC1 and SAC2. Thus, the first semiconductor laser element LD1 and the second semiconductor laser element LD2 can be hermetically sealed by the first sealing cover 30. An embodiment of the present disclosure has such a configuration in which the first sealing cover 30 is bonded to the support base 10 such that a plurality of semiconductor laser elements are sealed. According to a production method, the first semiconductor laser element LD1 and the second semiconductor laser element LD2 are mounted to corresponding ones of the mounting surfaces T and thereafter covered with the first sealing cover 30. The first semiconductor laser element LD1 and the second semiconductor laser element LD2 may be mounted to the mounting surfaces T before the first sealing cover 30 is provided, or may be mounted to the mounting surfaces T in the middle of the process of providing the first sealing cover 30. Thus, alignment of optical axes is easy compared with a case in which the semiconductor laser elements are sealed in corresponding semiconductor laser packages and thereafter the resultant semiconductor laser packages are mounted onto the support base. Further, the distance between the centers of adjoining semiconductor laser elements can be reduced as compared with a case in which semiconductor laser elements are held in separate semiconductor laser packages in a one-to-one fashion. This enables a large number of semiconductor laser elements to be arranged without consideration of physical interference of semiconductor laser packages with one another. Further, each of the semiconductor laser elements is not surrounded by a corresponding semiconductor laser package, so that sufficient space can be secured around each of the semiconductor laser elements for mounting optical members or electronic devices such as a photodiode. Further, the effects of sealing can be obtained, so that a decrease of the light output resulting from the optical dust-attracting effect can be suppressed, and the reliability of the semiconductor laser device can be improved.

After the lower end of the lateral wall 32 of the first sealing cover 30 is bonded to the first groove 16 of the mounting surfaces T, the top surface part 33 of the first sealing cover 30 may be secured to the lateral wall 32 such that the first sealing cover 30 is produced. In this case, the step of mounting the first semiconductor laser element LD1 and the second semiconductor laser element LD2 to the mounting surfaces T may be provided between the step of bonding the lower end of the lateral wall 32 of the first sealing cover 30 to the first groove 16 of the mounting surfaces T and the step of securing the top surface part 33 of the first sealing cover 30 to the lateral wall 32 such that the first sealing cover 30 is produced. In this manner, after the optical axis of laser light emitted by the first semiconductor laser element LD1 and the optical axis of the first slow-axis collimator lens SAC1 are aligned and the optical axis of laser light emitted by the second semiconductor laser element LD2 and the optical axis of the second slow-axis collimator lens SAC2 are aligned, the top surface part 33 can be secured to the lateral wall 32 for sealing. That is, the optical axes can be easily aligned, and the semiconductor laser elements LD can be sealed.

As shown in FIG. 3 and FIG. 4, each of the plurality of mounting surfaces T includes a first region 11 covered with the first sealing cover 30 and a second region 12 located outside the first sealing cover 30. In the present embodiment, in each of the plurality of mounting surfaces T, the height of the first region 11 from the reference plane Ref is equal to the height of the second region 12 from the reference plane Ref. In this specification, the phrase "in each of the plurality of mounting surfaces T, the height of the first region 11 from the reference plane Ref is equal to the height of the second region 12 from the reference plane Ref" encompasses a case in which "the height of the first region 11 from the reference plane Ref in each of the plurality of mounting surfaces T is within the range of ±1% relative to the height of the second region 12 from the reference plane Ref in each of the plurality of mounting surfaces T". The first semiconductor laser element LD1 and the second semiconductor laser element LD2 are present on the first region 11. Meanwhile, the first slow-axis collimator lens SAC1 and the second slow-axis collimator lens SAC2 are present on the second region 12. For example, at the first mounting surface T1, the height of the first region 11 to which the first semiconductor laser element LD1 is secured and the height of the second region 12 are equal and, therefore, the optical axis of the first semiconductor laser element LD1 can be easily aligned with an optical axis secured to the second region 12. The same also applies to the second mounting surface T2. In the present embodiment, in each of the mounting surfaces T, the first region 11 and the second region 12 are parallel to each other and coplanar with each other. As a result, the optical axis of a part mounted to the first region 11 and the optical axis of a part mounted to the second region 12 can be easily aligned. In this specification, the expression "the first region and the second region are parallel to each other" includes a case in which the second region forms an angle of not more than ±0.1 degrees with respect to the first region.

The first fast-axis collimator lens FAC1 is provided at a position between the first semiconductor laser element LD1 and the first slow-axis collimator lens SAC1 on which the first laser light 31 emitted from the first semiconductor laser element LD1 is incident. The second fast-axis collimator lens FAC2 is provided at a position between the second semiconductor laser element LD2 and the second slow-axis collimator lens SAC2 on which the second laser light B2 emitted from the second semiconductor laser element LD2 is incident. In the example illustrated in FIG. 3 and FIG. 4, the lateral wall 32 of the first sealing cover 30 surrounds the first fast-axis collimator lens FAC1 and the second fast-axis collimator lens FAC2. In other words, the first sealing cover 30 also seals the first fast-axis collimator lens FAC1 and the second fast-axis collimator lens FAC2. With this configuration, the first fast-axis collimator lens FAC1 can be mounted close to the light-emitting end surface of the first semiconductor laser element LD1 without interference from the first sealing cover 30. Likewise, the second fast-axis collimator lens FAC2 can be mounted close to the light-emitting end surface of the second semiconductor laser element LD2. By decreasing the distance between a fast-axis collimator lens FAC and the light-emitting end surface of a corresponding semiconductor laser element LD, the focal length and size of the fast-axis collimator lens FAC can be reduced, and the size in the fast-axis direction of collimated light can be reduced.

As described above, in the present embodiment, the first fast-axis collimator lens FAC1 and the second fast-axis collimator lens FAC2 are located inside the first sealing cover 30, while the first slow-axis collimator lens SAC1 and the second slow-axis collimator lens SAC2 are located outside the first sealing cover 30. With this configuration, the semiconductor laser elements can be sealed at one time while the size in the fast-axis direction of collimated light is reduced. With the slow-axis collimator lenses SAC located outside the first sealing cover 30, the volume of the space for hermetic sealing can be reduced, which can facilitate hermetic sealing. Further, with the slow-axis collimator lenses SAC located outside the first sealing cover 30, the adhesive agent used for securing the slow-axis collimator lenses SAC can be selected from a wider variety of materials. For example, resins can be selected as the material of the adhesive agent. The use of resins can make alignment of the optical axis easier than the use of other adhesive agents. Further, the resins enable the slow-axis collimator lenses SAC to be easily secured.

In the present embodiment, the support base 10 has a first groove 16 receiving at least a part of the lateral wall 32 of the first sealing cover 30. A part or an entirety of the lower end of the lateral wall 32 of the first sealing cover 30 is bonded to the bottom surface of the first groove 16. The height of the bottom surface of the first groove 16 from the reference plane Ref is preferably constant along the first direction (the positive direction of the X axis). As shown in FIG. 3 and FIG. 4, the depth of the first groove 16 is different among the plurality of mounting surfaces T, although the height of the bottom surface of the first groove 16 from the reference plane Ref is equal. With the support base 10 having such a first groove 16, the lateral wall 32 of the first sealing cover 30 does not need to have steps corresponding to the steps between the mounting surfaces T, and the lateral wall 32 can have a simple shape, for example, a generally rectangular shape. This enables easy production of the first sealing cover 30 and can reduce decrease of the sealing strength due to dimensional misalignment at the sealing portion and hence improve the reliability of the sealing. The width in z direction of the first groove 16 can be, for example, not less than twice and not more than 50 times, preferably not less than twice and not more than 10 times, the thickness in z direction of the lateral wall 32 of the first sealing cover 30. With this configuration, the width of the first groove 16 can be sufficiently large for the thickness of the lateral wall 32 of the first sealing cover 30 and, therefore, the first sealing cover 30 can be easily bonded to the support base 10.

As shown in FIG. 1, FIG. 2, FIG. 3 and FIG. 4, the semiconductor laser device 100 further includes a first submount SB1 supporting the first semiconductor laser element LD1 and a second submount SB2 supporting the second semiconductor laser element LD2. Each of the submounts SB1, SB2 can have, for example, a rectangular shape. The submounts SB1, SB2 can be made of, for example, aluminum nitride, silicon carbide, a metal matrix composite material with diamond particles dispersed therein, or graphite. The upper surface and the lower surface of each of the submounts SB1, SB2 can be provided with a metal film for bonding to the semiconductor laser elements LD or the support base 10. The submounts SB1, SB2 and the semiconductor laser, or the submounts and the support base 10, can be bonded using a bonding material. The bonding material can be, for example, AuSn solder, Ag paste, Cu paste, Au paste, or the like.

The first submount SB1 includes a first lens supporting member supporting the first fast-axis collimator lens FAC1. The second submount SB2 includes a second lens supporting member supporting the second fast-axis collimator lens FAC2. Hereinafter, an example of such a configuration is described in detail by illustrating the first semiconductor laser element LD1 as an example.

Figure 5A:
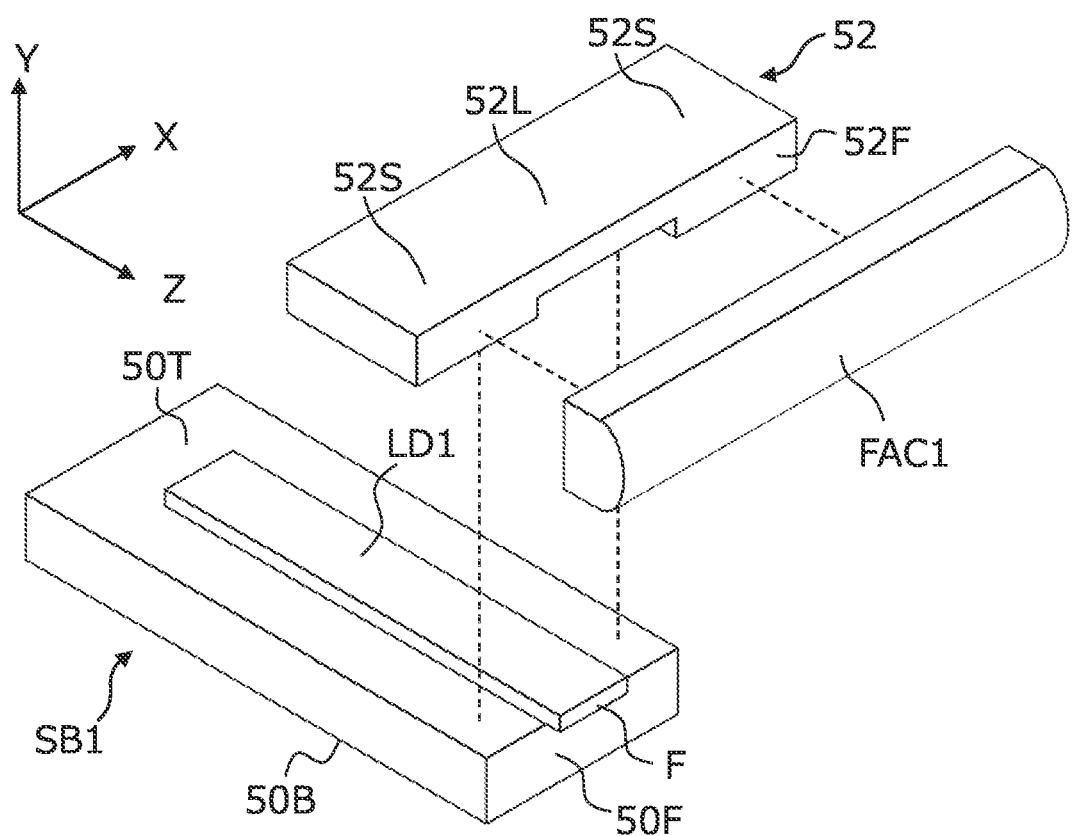
FIG. 5A is a perspective view schematically showing a configuration example of a light source inside a sealing cover in an embodiment of the present disclosure.
Figure 5B:
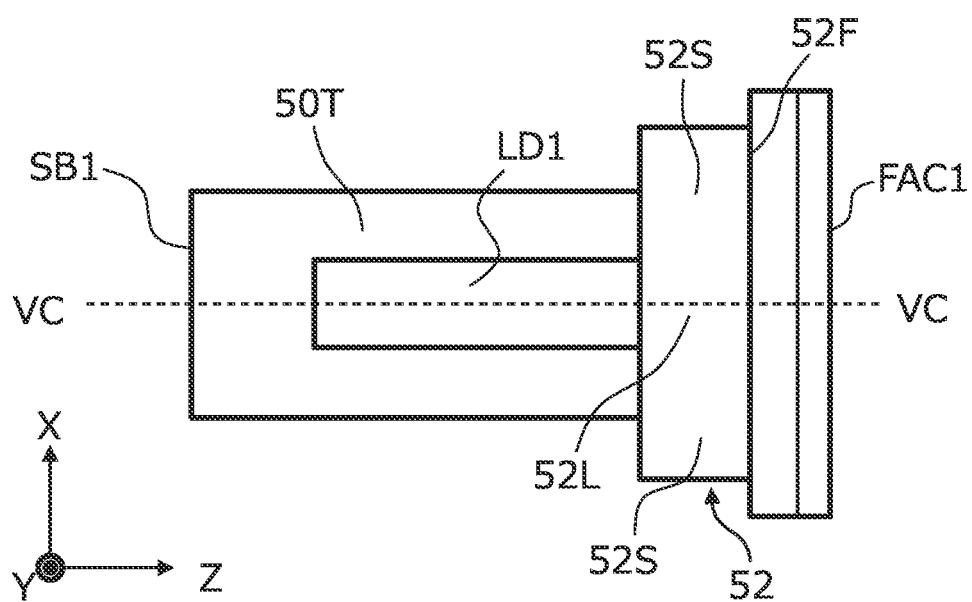
FIG. 5B is a top view schematically showing the light source of FIG. 5A.
Figure 5C:
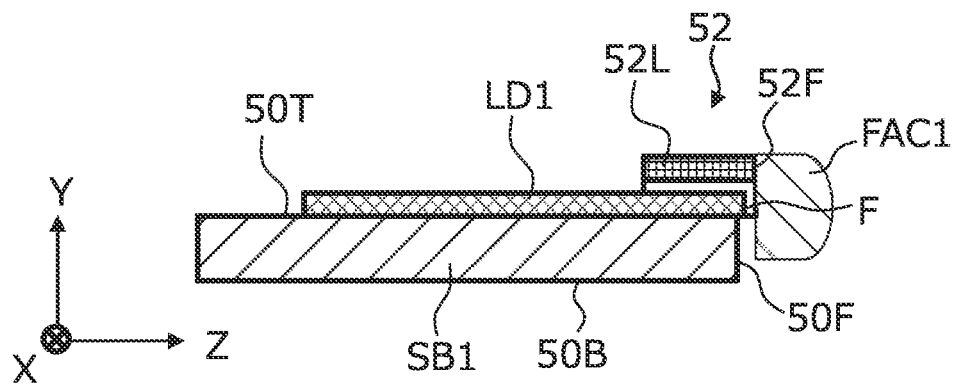
FIG. 5C is a cross-sectional view of the light source of FIG. 5B taken along line VC-VC that is parallel to the YZ plane.
Figure 5D:
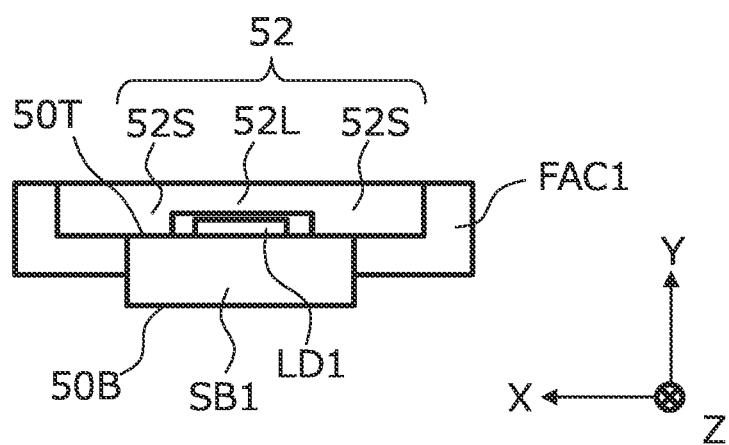
FIG. 5D is a rear view schematically showing the light source of FIG. 5A.

FIG. 5A is an exploded perspective view of the first semiconductor laser element LD1 to be sealed with the first sealing cover 30, the first submount SB1, and the first fast-axis collimator lens FAC1. In this example, the first semiconductor laser element LD1 is bonded to the upper surface of the first submount SB1, the lens supporting member 52 is bonded to the upper surface of the first submount SB1, and the first fast-axis collimator lens FAC1 is secured to the lens supporting member 52. The first fast-axis collimator lens is secured to the lens supporting member 52 via an adhesive agent. The adhesive agent can be, for example, Au paste, Ag paste, Cu paste, AuSn solder, or the like. FIG. 5B is a top view schematically showing the configuration of FIG. 5A. FIG. 5C is a cross-sectional view of the configuration of FIG. 5B taken along line VC-VC that is parallel to the YZ plane. FIG. 5D is a rear view schematically showing the configuration of FIG. 5A.

As shown in FIG. 5A, the first submount SB1 has a major surface 50T, a rear surface 50B and a front end surface 50F. The first semiconductor laser element LD1 is mounted face down to the major surface 50T of the first submount SB1. The first semiconductor laser element LD1 is arranged such that the light-emitting end surface F juts forward relative to the first submount SB1. This arrangement can reduce reflection of part of laser light emitted from the light-emitting end surface F by the first submount. The lens supporting member 52 supporting the first fast-axis collimator lens FAC1 is bonded to the major surface 50T of the first submount SB1. The lens supporting member 52 includes a pair of securing sections 52S bonded to the major surface 50T and a connecting section 52L connecting the pair of securing sections 52S. The connecting section 52L has such a shape that traverses over the first semiconductor laser element LD1 so as not to block travel of laser light emitted from the light-emitting end surface F of the first semiconductor laser element LD1.

In FIG. 5A, the first submount SB1, the lens supporting member 52 and the first fast-axis collimator lens FAC1 are illustrated as being separated although, in actuality, these are bonded together.

In the top view of FIG. 5B, the connecting section 52L overlaps the light-emitting end surface F of the first semiconductor laser element LD1. As shown in FIG. 5D, the lens supporting member 52 is arranged on the major surface 50T of the first submount SB1 so as to traverse over the first semiconductor laser element LD1. The size in the X direction of the lens supporting member 52 may be greater than, or may be smaller than, the size in the X direction of the first submount SB1. For example, the size in the X direction of the lens supporting member 52 can be greater than the size in the X direction of the first submount SB1. In this case, the area of the end surface 52F of the lens supporting member 52 increases, and it is possible to increase the area in which the FAC lens 1 is bonded to the lens supporting member 52. As a result, the first fast-axis collimator lens FAC1 can be easily bonded to the end surface 52F of the lens supporting member 52. The size in the Y direction of the lens supporting member 52 can be substantially equal to the size in the Y direction of the first fast-axis collimator lens FAC1. The size in the Y direction of the lens supporting member 52 may be greater than, equal to, or smaller than the size in the Y direction of the fast-axis collimator lens FAC1. The size in the X direction of the lens supporting member 52 is, for example, not less than 1 mm and not more than 2 mm. The maximum size in the Y direction of the lens supporting member 52 is, for example, not less than 0.3 mm and not more than 2 mm. The size in the Z direction of the lens supporting member 52 is, for example, not less than 0.2 mm and not more than 1 mm.

A method of producing the illustrated configuration includes, for example, the step of bonding the first semiconductor laser element LD1 to the major surface 50T of the first submount SB1, the step of bonding the lens supporting member 52 to the major surface 50T of the first submount SB1 so as to traverse over the first semiconductor laser element LD1, and the step of bonding the first fast-axis collimator lens FAC1 to the end surface 52F of the lens supporting member 52. These steps may be performed in this order. Alternatively, the lens supporting member 52 with the first fast-axis collimator lens FAC1 bonded thereto may be bonded to the first submount SB1 to which the first semiconductor laser element LD1 has been bonded at the major surface 50T.

In this example, the first semiconductor laser element LD1 and the lens supporting member 52 are bonded to the major surface 50T of the first submount SB1, and the first fast-axis collimator lens FAC1 is bonded to the end surface 52F of the lens supporting member 52. With this configuration, the gap between the first semiconductor laser element LD1 and the first fast-axis collimator lens FAC1 can be narrowed. Accordingly, the size of the first fast-axis collimator lens FAC1 can be reduced. Further, the size in the fast-axis direction of the laser light B1 collimated in the first fast-axis direction can be reduced.

The above-described configuration can also be realized likewise for the second semiconductor laser element LD2. The configuration shown in FIG. 5A, FIG. 5B, FIG. 5C and FIG. 5D is merely exemplary.

The method of securing the fast-axis collimator lens FAC to the submount SB is not limited to the above-described example.

According to the present embodiment, the submounts SB supporting both the semiconductor laser elements LD and the fast-axis collimator lenses FAC are secured to the first region 11 of the support base 10, while the slow-axis collimator lenses SAC and the mirrors M are secured to the second region 12 of the support base 10. In the present embodiment, the lower end of the lateral wall 32 of the first sealing cover 30 is bonded to the first groove 16 of the mounting surfaces T and, thereafter, the submounts SB supporting both the semiconductor laser elements LD and the fast-axis collimator lenses FAC are bonded to the support base 10. Thereafter, the optical axes are aligned and, thereafter, the top surface part 33 of the first sealing cover 30 is secured to the lateral wall 32, so that the semiconductor laser elements LD are sealed in the space defined by the first sealing cover 30. In this manner, the optical axes can be easily aligned. Also, it is possible to hermetically seal the semiconductor laser elements LD so that optical dust attraction can be reduced.

As shown in FIG. 1, the semiconductor laser device 100 further includes a beam combining section 20 for combining the first laser light B1 outgoing from the first slow-axis collimator lens SAC1 and the second laser light B2 outgoing from the second slow-axis collimator lens SAC2. The beam combining section 20 includes a first mirror M1 provided in the second region 12 of the first mounting surface T1 and a second mirror M2 provided in the second region 12 of the second mounting surface T2. The first mirror M1 reflects the first laser light B1 in the first direction. The second mirror M2 reflects the second laser light B2 in the first direction. The beam combining section 20 further includes a condenser lens 42 configured to couple the first laser light B1 and the second laser light B2 reflected in the first direction with an optical fiber 40. In the illustrated example, the condenser lens 42 includes a fast-axis condenser lens 42a and a slow-axis condenser lens 42b. In this example, the focal length of the fast-axis condenser lens 42a is longer than the focal length of the slow-axis condenser lens 42b. Therefore, the slow-axis condenser lens 42b is located closer to the light-entering end of the optical fiber 40 than the fast-axis condenser lens 42a.

The first laser light B1 impinging on the first mirror M1 is light collimated by the first fast-axis collimator lens FAC1 and the first slow-axis collimator lens SAC1. Likewise, the second laser light B2 impinging on the second mirror M2 is light collimated by the second fast-axis collimator lens FAC2 and the second slow-axis collimator lens SAC2. As shown in FIG. 3 and FIG. 4, the height of the first mirror M1 and the height of the second mirror M2 from the reference plane Ref are different from each other. Therefore, the height of a position where the first laser light B1 reflected by the first mirror M1 enters the fast-axis condenser lens 42a is different from the height of a position where the second laser light B2 reflected by the second mirror M2 enters the fast-axis condenser lens 42a. The difference between these heights is approximately equal to the size of the step between the mounting surface T1 and the mounting surface T2. Herein, "approximately equal" means that, for example, the difference between the thickness of the adhesive agent provided between the first mirror M1 and the support base 10 and the thickness of the adhesive material provided between the second mirror M2 and the support base 10 is negligible. The mirrors M can be secured to the mounting surfaces T via an adhesive agent. Examples of the adhesive agent include AuSn solder, Ag paste, Cu paste, Au paste, resins, and so on. The mirrors M may be secured to the mounting surfaces T of the support base 10 via parts that are configured to adjust the position and orientation of the mirrors M. The reflection surface of the mirrors M is desirably formed by a multilayer film that selectively has high reflectance at the wavelength of incoming laser light. On the mounting surfaces T, an optical part other than the mirrors M, for example, a filter having wavelength selectivity, may be provided. Further, the slow-axis collimator lenses SAC may be secured to the mounting surfaces T of the support base 10 via parts that is configured to adjust the position and orientation of the mirrors M.

The first semiconductor laser element LD1 and the second semiconductor laser element LD2 can be, for example, a semiconductor laser element for emitting violet light, a semiconductor laser element for emitting blue light, a semiconductor laser element for emitting green light, or a semiconductor laser element for emitting red light. Herein, the violet light has an oscillation wavelength equal to or higher than 360 nm and equal to or lower than 420 nm. The blue light has an emission peak wavelength higher than 420 nm and equal to or lower than 495 nm. The green light has an emission peak wavelength higher than 495 nm and equal to or lower than 570 nm. The red light has an emission peak wavelength equal to or higher than 605 nm and equal to or lower than 750 nm. The semiconductor laser element for emitting violet light, the semiconductor laser element for emitting blue light, or the semiconductor laser element for emitting green light can be a semiconductor laser element that includes a nitride semiconductor. As the nitride semiconductor, for example, GaN, InGaN, and AlGaN can be used. The semiconductor laser element for emitting red light can be an InAlGaP based, GaInP based, GaAs based, or AlGaAs based semiconductor.

According to the semiconductor laser device 100 of the present embodiment, it is possible to reduce the volume of the space in which a plurality of semiconductor laser elements are sealed.

According to the semiconductor laser device 100 of the present embodiment, the sealing structure that facilitates alignment of the optical axes of the semiconductor laser elements and the optical axes of the slow-axis collimator lenses improves the reliability, and laser light emitted from the plurality of semiconductor laser elements can be optically coupled with a single optical fiber.

The Second Embodiment

Figure 6:
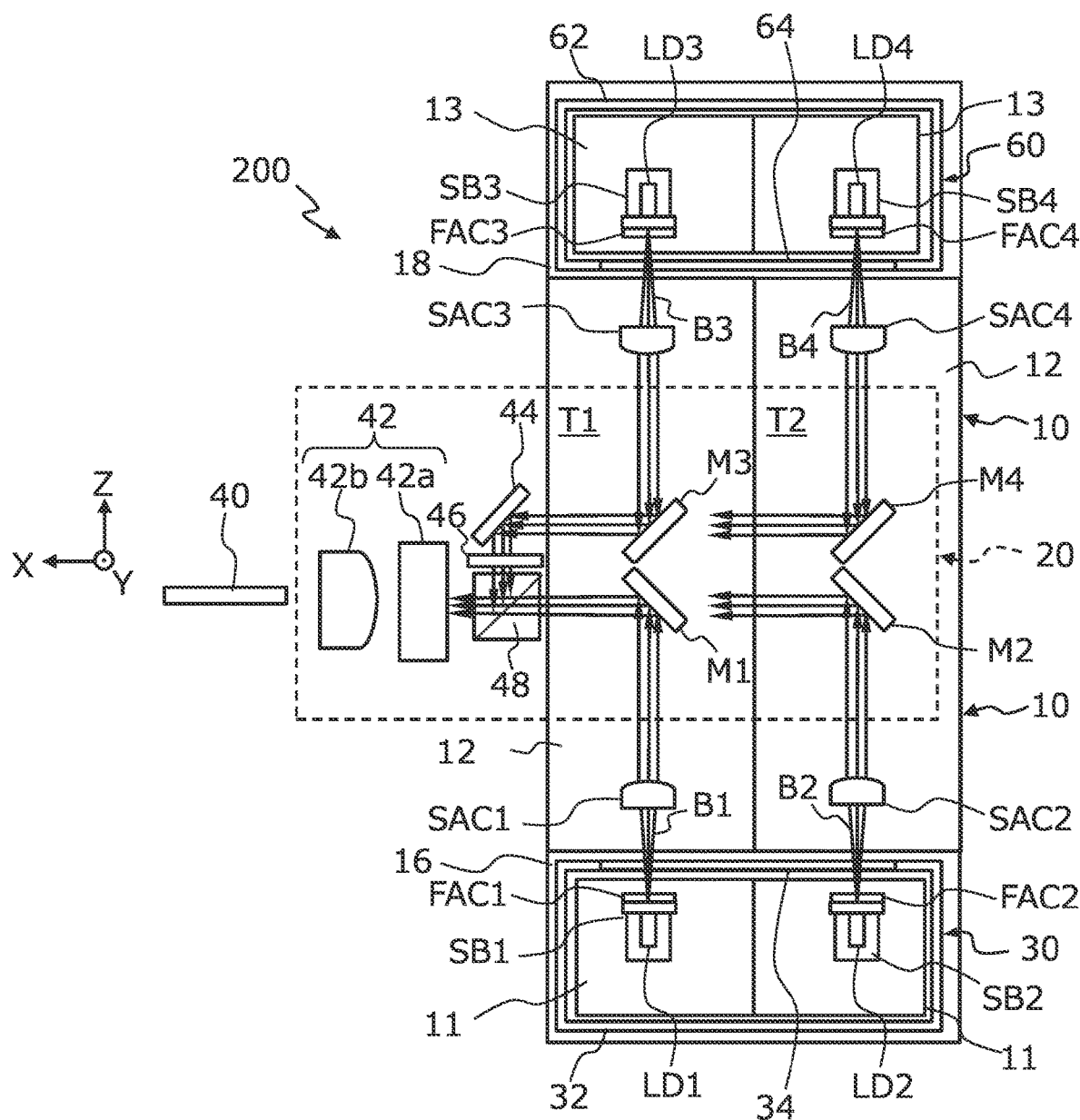
FIG. 6 is a top view schematically showing a configuration example of a semiconductor laser device in the second embodiment of the present disclosure.

Next, another embodiment of the semiconductor laser element of the present disclosure is described. FIG. 6 is a top view schematically showing a configuration example of a semiconductor laser device 200 of the present embodiment. FIG. 6 is a top view showing a second sealing cover 60 (described later) from which a top surface part 63 has been removed.

The semiconductor laser device 200 of FIG. 6 further includes, in addition to the components shown in FIG. 1, a third semiconductor laser element LD3, a fourth semiconductor laser element LD4, a third slow-axis collimator lens SAC3, a fourth slow-axis collimator lens SAC4, and a second sealing cover 60. In this example, the semiconductor laser device 200 includes a third fast-axis collimator lens FAC3 and a fourth fast-axis collimator lens FAC4.

Each of the third semiconductor laser element LD3 and the fourth semiconductor laser element LD4 may have the same configuration and shape as those of the first semiconductor laser element LD1 and the second semiconductor laser element LD2 that have previously been described in the foregoing. Also, the third slow-axis collimator lens SAC3, the fourth slow-axis collimator lens SAC4, the third fast-axis collimator lens FAC3, the fourth fast-axis collimator lens FAC4, and the second sealing cover 60 may have the same configuration and shape as those of the first slow-axis collimator lens SAC1, the second slow-axis collimator lens SAC2, the first fast-axis collimator lens FAC1, the second fast-axis collimator lens FAC2, and the first sealing cover 30, respectively, of the semiconductor laser device 100.

The third semiconductor laser element LD3 is directly or indirectly secured to the first mounting surface T1 included in the plurality of mounting surfaces T. The third semiconductor laser element LD3 is arranged so as to emit third laser light B3 in a direction opposite to the second direction (the positive direction of the Z axis), i.e., in the negative direction of the Z axis, in a plan view from the normal direction of the reference plane Ref (the positive direction of the Y axis). The fourth semiconductor laser element LD4 is directly or indirectly secured to the second mounting surface T2 included in the plurality of mounting surfaces T. The fourth semiconductor laser element LD4 is arranged so as to emit fourth laser light B4 in a direction opposite to the second direction (the positive direction of the Z axis), i.e., in the negative direction of the Z axis, in the aforementioned plan view.

The third slow-axis collimator lens SAC3 is directly or indirectly secured to the first mounting surface T1 and is provided at a position on which the third laser light B3 is incident. The fourth slow-axis collimator lens SAC4 is directly or indirectly secured to the second mounting surface T2 and is provided at a position on which the fourth laser light B4 is incident.

The second sealing cover 60 includes a lateral wall 62 surrounding the third semiconductor laser element LD3 and the fourth semiconductor laser element LD4. The lower end of the lateral wall 62 is bonded to the support base 10. The second sealing cover 60 defines the inner space in which the third semiconductor laser element LD3 and the fourth semiconductor laser element LD4 are held and includes a light-transmitting region 64 for transmitting the third laser light B3 and the fourth laser light B4. Thus, the third semiconductor laser element LD3 and the fourth semiconductor laser element LD4 can be hermetically sealed by the second sealing cover 60. An embodiment of the present disclosure has such a configuration in which the first sealing cover 30 and the second sealing cover 60 are bonded to the support base 10 such that a plurality of semiconductor laser elements are sealed. According to a production method, the third semiconductor laser element LD3 and the fourth semiconductor laser element LD4 are mounted to corresponding ones of the mounting surfaces T and thereafter covered with the second sealing cover 60. The third semiconductor laser element LD3 and the fourth semiconductor laser element LD4 may be mounted to the mounting surfaces T before the second sealing cover 60 is provided, or may be mounted to the mounting surfaces T in the middle of the process of providing the second sealing cover 60.

Each of the plurality of mounting surfaces T includes a third region 13 covered with the second sealing cover 60.

The second region 12 is located between the first region 11 and the third region 13.

In the present embodiment, in each of the plurality of mounting surfaces T, the height of the third region 13 from the reference plane Ref is equal to the height of the second region 12 from the reference plane Ref. The third semiconductor laser element LD3 and the fourth semiconductor laser element LD4 are present on the third region 13. Meanwhile, the third slow-axis collimator lens SAC3 and the fourth slow-axis collimator lens SAC4 are present on the second region 12.

The third fast-axis collimator lens FAC3 is provided at a position between the third semiconductor laser element LD3 and the third slow-axis collimator lens SAC3 on which the third laser light B3 emitted from the third semiconductor laser element LD3 is incident. The fourth fast-axis collimator lens FAC4 is provided at a position between the fourth semiconductor laser element LD4 and the fourth slow-axis collimator lens SAC4 on which the fourth laser light B4 emitted from the fourth semiconductor laser element LD4 is incident. In the example illustrated in FIG. 6, the lateral wall 62 of the second sealing cover 60 surrounds the third fast-axis collimator lens FAC3 and the fourth fast-axis collimator lens FAC4. In other words, the second sealing cover 60 also seals the third fast-axis collimator lens FAC3 and the fourth fast-axis collimator lens FAC4. With this configuration, the third fast-axis collimator lens FAC3 can be mounted close to the light-emitting end surface of the third semiconductor laser element LD3 without being interfered by the second sealing cover 60. Likewise, the fourth fast-axis collimator lens FAC4 can be mounted close to the light-emitting end surface of the fourth semiconductor laser element LD4.

As previously described, in the present embodiment, the third fast-axis collimator lens FAC3 and the fourth fast-axis collimator lens FAC4 are located inside the second sealing cover 60, while the third slow-axis collimator lens SAC3 and the fourth slow-axis collimator lens SAC4 are located outside the second sealing cover 60. With this configuration, the semiconductor laser elements can be sealed at one time while the size in the fast-axis direction of collimated light is reduced. With the slow-axis collimator lenses SAC located outside the second sealing cover 60, the volume of the space for hermetic sealing can be reduced so that hermetic sealing can be easier.

In the present embodiment, the support base 10 has a second groove 18 receiving at least part of the lateral wall 62 of the second sealing cover 60. A part or an entirety of the lower end of the lateral wall 62 of the second sealing cover 60 is bonded to the bottom surface of the second groove 18. The height of the bottom surface of the second groove 18 from the reference plane Ref is also preferably constant along the first direction (the positive direction of the X axis) likewise as in the first groove 16.

As shown in FIG. 6, the semiconductor laser device 200 of the present embodiment further includes a third submount SB3 supporting the third semiconductor laser element LD3 and a fourth submount SB4 supporting the fourth semiconductor laser element LD4. The third submount SB3 and the fourth submount SB4 can have the same configuration as the first submount SB1 and the second submount SB2 and can be made of the same material as the first submount SB1 and the second submount SB2.

By using the previously-described lens supporting members, the third submount SB3 can support the third fast-axis collimator lens FAC3, and the fourth submount SB4 can support the fourth fast-axis collimator lens FAC4.

The beam combining section 20 of the present embodiment includes a third mirror M3 provided in the second region 12 of the first mounting surface T1 and a fourth mirror M4 provided in the second region 12 of the second mounting surface T2. The third mirror M3 reflects the third laser light B3 in the first direction. The fourth mirror M4 reflects the fourth laser light B4 in the first direction. The beam combining section 20 further includes a mirror 44 that guides the third laser light B3 reflected by the third mirror M3 and the fourth laser light B4 reflected by the fourth mirror M4 to a condenser lens 42 (the fast-axis condenser lens 42a, the slow-axis condenser lens 42b), a half-wave plate 46, and a beam combiner 48. The half-wave plate 46 is provided between the mirror 44 and the beam combiner 48.

The mirror 44 has a reflection surface whose shape and size are configured to receive the third laser light B3 reflected by the third mirror M3 and the fourth laser light B4 reflected by the fourth mirror M4. The mirror 44 reflects the third laser light B3 reflected by the third mirror M3 and the fourth laser light B4 reflected by the fourth mirror M4 so as to travel toward the beam combiner 48.

When the third laser light B3 and the fourth laser light B4 pass through the half-wave plate 46, the half-wave plate 46 rotates the polarization direction of the third laser light B3 and the fourth laser light B4 by 90 degrees on an axis parallel to the Z axis. The optic axis of the half-wave plate 46 is inclined by 45 degrees with respect to the polarization direction of the laser light reflected by the mirror 44. In the present embodiment, the polarization direction of the laser light reflected by the mirror 44 is parallel to the X axis. The optic axis of the half-wave plate 46 is parallel to the XY plane and oriented in a direction that intersects with the XZ plane at 45 degrees. Thus, when the laser light reflected by the mirror 44 passes through the half-wave plate 46, the polarization direction of the laser light rotates by 90 degrees on an axis parallel to the Z axis. As a result, when the laser light reflected by the mirror 44 is incident on the beam combiner 48, the polarization direction of the laser light is parallel to the Y axis.

The beam combiner 48 has the same configuration as a polarizing beam splitter. Specifically, the beam combiner 48 reflects laser light whose polarization direction is parallel to the Y axis but transmits laser light whose polarization direction is parallel to the Z axis. Thus, both of the laser light from the semiconductor laser elements LD sealed with the first sealing cover 30 and the laser light from the semiconductor laser elements LD sealed with the second sealing cover 60 enter the condenser lens 42. Therefore, the beam combiner 48 reflects the third laser light B3 and the fourth laser light B4 reflected by the mirror 44 in the first direction so as to travel toward the condenser lens 42 while the beam combiner 48 transmits the first laser light B1 reflected by the first mirror M1 and the second laser light B2 reflected by the second mirror M2 so as to travel toward the condenser lens 42. Then, the laser light reflected by the mirror 44 and the laser light transmitted through the beam combiner 48 are optically coupled by the condenser lens 42 with the optical fiber 40.

As clearly understood from the foregoing description, the plurality of mounting surfaces T of the semiconductor laser device 200 and a plurality of electronic parts and optical parts placed on the plurality of mounting surfaces T are in a substantially symmetrical arrangement about the XY plane of FIG. 6.

In the present embodiment, the first semiconductor laser element LD1, the second semiconductor laser element LD2, the third semiconductor laser element LD3 and the fourth semiconductor laser element LD4 oscillate any laser light of green light, blue light and violet light. The semiconductor laser elements LD preferably oscillate laser light of the same color selected from green light, blue light and violet light. When the semiconductor laser elements LD oscillate light of the same color, optical designing of the lenses, the beam combiner 48, and other optical elements is easy, and laser light can be efficiently condensed to the optical fiber 40.

According to the semiconductor laser device 200 of the present embodiment, the following effects can be achieved in addition to the effects previously described in conjunction with the semiconductor laser device 100.

- By increasing the number of rows of semiconductor laser elements arranged in the first direction (the positive direction of the X axis) to two, the number of semiconductor laser elements mounted to the support base 10 can be increased without increasing the size in the first direction of the support base. The increase in the number of semiconductor laser elements can improve the intensity of laser light to be coupled with the optical fiber.
- Groups of semiconductor laser elements provided in different regions are covered with two different sealing covers rather than covering all of the semiconductor laser elements on the support base with a single sealing cover. With this structure, the sealing space can be divided into relatively narrow portions. This can improve the reliability of sealing.
- The semiconductor laser elements on the support base are separately provided in two regions at opposite positions on the support base rather than gathering all of the semiconductor laser elements on the support base in a single region.

Therefore, the heat produced during the operation of the semiconductor laser elements are more likely to be dissipated. As a result, an excessive increase in temperature of the semiconductor laser device is reduced so that the operation reliability can improve and the device life can be longer.

Third Embodiment

Figure 7:
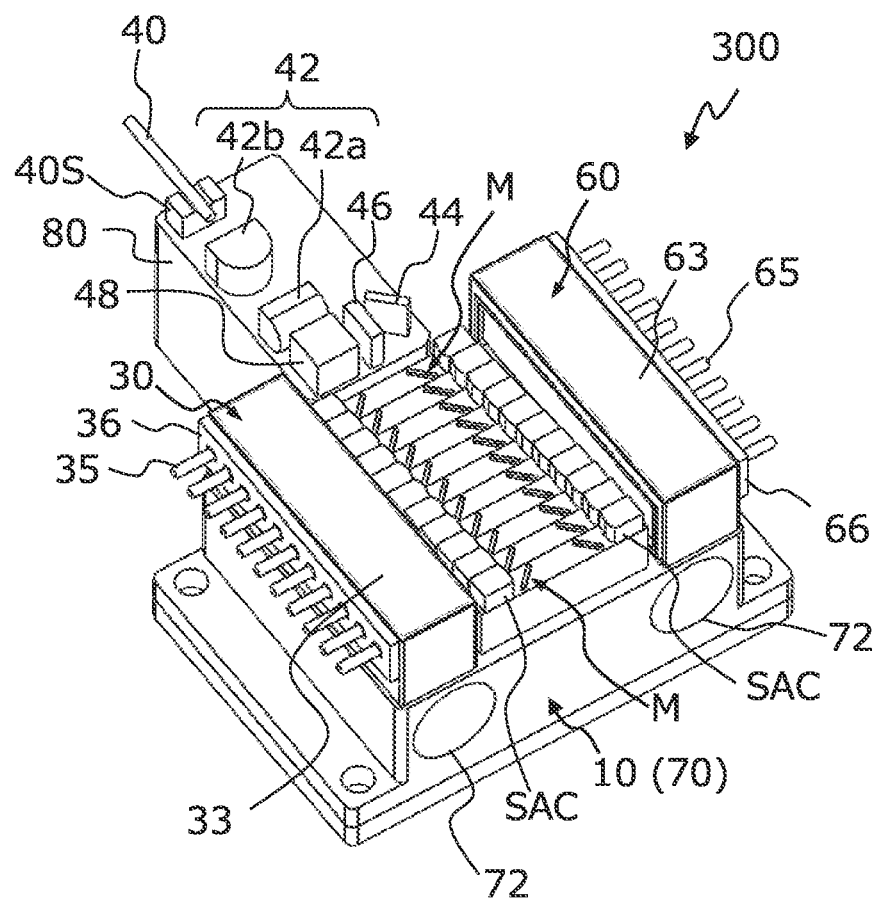
FIG. 7 is a perspective view of a semiconductor laser device in the third embodiment of the present disclosure.
Figure 8:
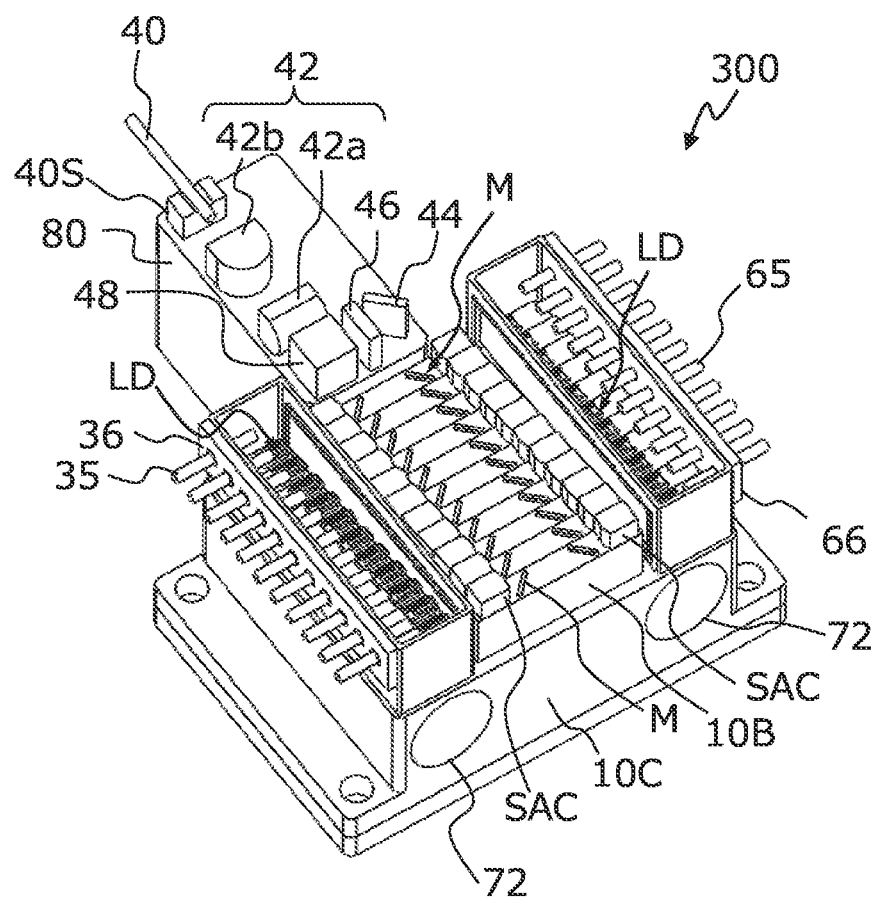
FIG. 8 is a perspective view showing the semiconductor laser device of FIG. 7 from which the top surface parts of the first sealing cover and the second sealing cover have been removed.
Figure 9:
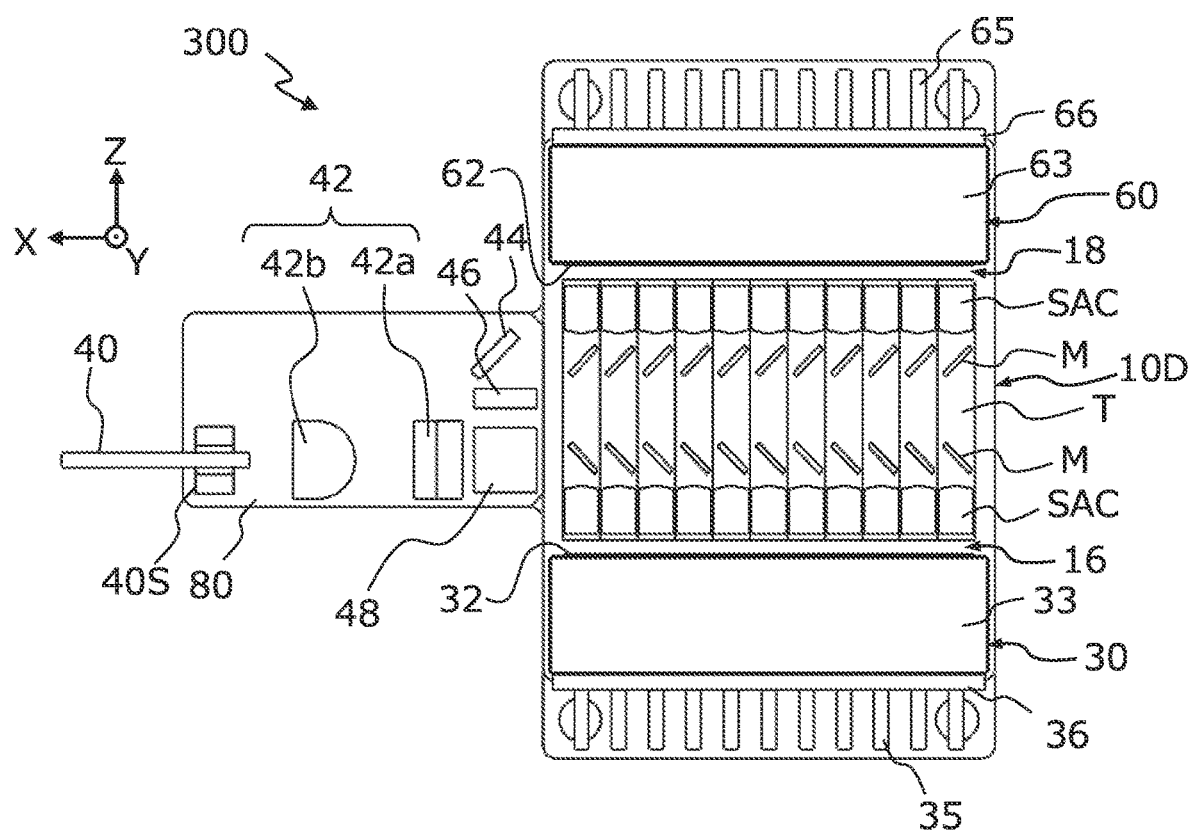
FIG. 9 is a top view of the semiconductor laser device of FIG. 7.
Figure 10:
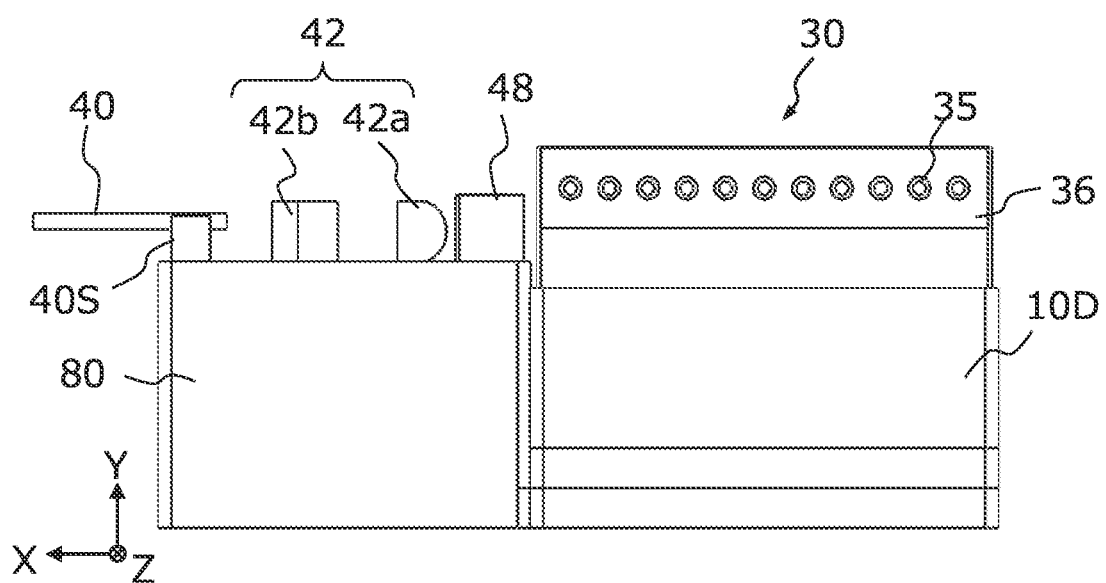
FIG. 10 is a side view of the semiconductor laser device of FIG. 7 as viewed from the negative direction of the Z axis.
Figure 11:
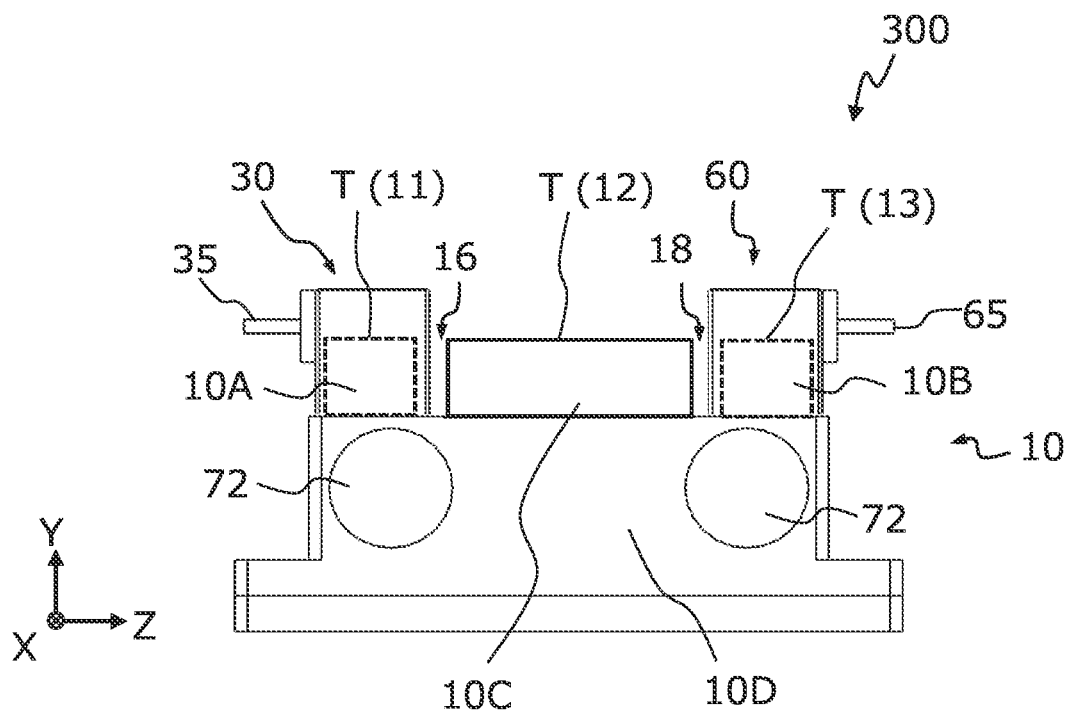
FIG. 11 is a side view of the semiconductor laser device of FIG. 7 as viewed from the negative direction of the X axis.
Figure 12:
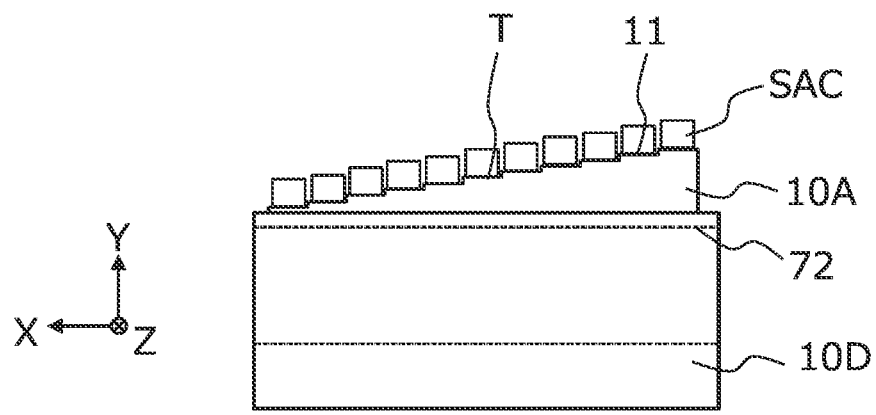
FIG. 12 is a diagram schematically showing steps of mounting surfaces of a support base included in the semiconductor laser device of FIG. 7.
Figure 13:
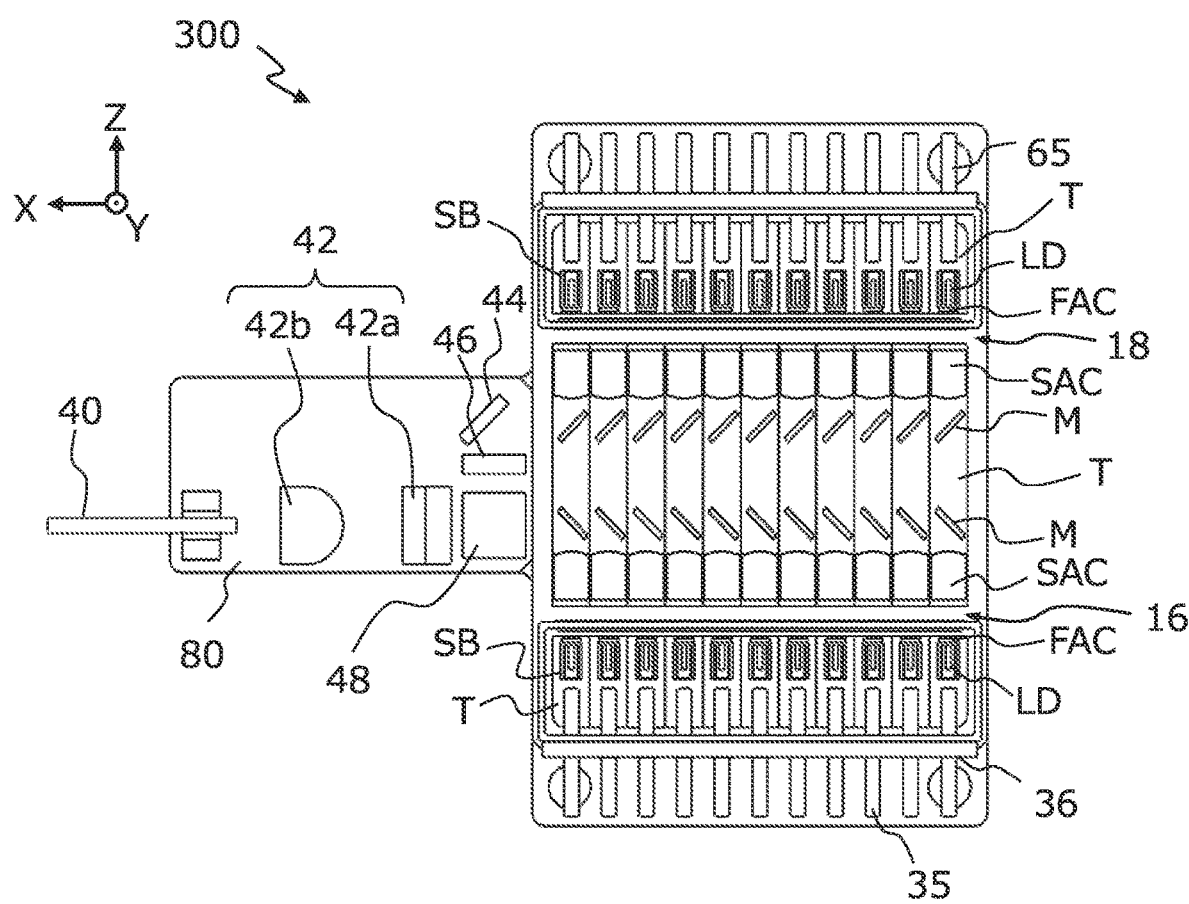
FIG. 13 is a top view of the semiconductor laser device in the state of FIG. 8.

Next, still another embodiment of the semiconductor laser device of the present disclosure is described with reference to FIG. 7 to FIG. 13. FIG. 7 is a perspective view of a semiconductor laser device 300 of the present embodiment. FIG. 8 is a perspective view showing the semiconductor laser device 300 from which the top surface part 33 of the first sealing cover 30 and the top surface part 63 of the second sealing cover 60 have been removed. FIG. 9 is a top view of the semiconductor laser device 300. FIG. 10 is a side view of the semiconductor laser device 300 as viewed from the negative direction of the Z axis. FIG. 11 is a side view of the semiconductor laser device 300 as viewed from the negative direction of the X axis. FIG. 12 is a diagram schematically showing the steps of the mounting surfaces T of the support base 10. FIG. 13 is a top view of the semiconductor laser device 300 in the state of FIG. 8.

The semiconductor laser device 300 has basically the same configuration as that of the semiconductor laser device 200. The first difference resides in the number of semiconductor laser elements LD, the number of fast-axis collimator lenses FAC, the number of slow-axis collimator lenses SAC, and the number of mirrors M. For example, in the semiconductor laser device 300, the number of semiconductor laser elements LD is 11×2=22, which is greater than the number of semiconductor laser elements LD in the semiconductor laser device 200. The peak wavelengths of laser light emitted by the semiconductor laser elements LD are approximately identical (e.g., about 465 nm±10 nm). The second difference resides in that the support base 10 includes the first portion 10A, the second portion 10B, the third portion 10C and the fourth portion 10D as shown in FIG. 11. This will be described later.

In the semiconductor laser device 300, 11 semiconductor laser elements LD are held and sealed in the first sealing cover 30. The top surface part 33 of the first sealing cover 30 has, for example, a rectangular shape of which the short side has the length of not less than 6 mm and not more than 12 mm and the long side has the length of not less than 20 mm and not more than 40 mm. The height of the lateral wall 32 is, for example, not less than 5 mm and not more than 12 mm. The length of the long side depends on the number of semiconductor laser elements LD sealed with the first sealing cover 30. Therefore, the length of the long side is not limited to the aforementioned length. In the present embodiment, the lateral wall 32 and the top surface part 33 of the first sealing cover 30 are made of, for example, a metal material such as Kovar or a common ceramic material. The thickness of the lateral wall 32 and the top surface part 33 of the first sealing cover 30 is, for example, not less than 0.1 mm and not more than 1 mm. One surface of the lateral wall 32 of the first sealing cover 30 has, for example, a thick portion 36 of having a thickness of not less than 0.2 mm and not more than 2 mm. In the example shown in FIG. 7, the thicker portion 36 has 11 holes arranged along the first direction (the positive direction of the X axis), and 11 electrical conductor leads 35 are provided so as to penetrate through the holes. The distance in the first direction between the centers of the holes is not less than 1 mm and not more than 4 mm. The distance between the centers of the holes may be equal to the distance in the first direction between the centers of the semiconductor laser elements LD. One of the p-electrode and the n-electrode of each of the semiconductor laser elements LD can be electrically coupled with a corresponding one of the electrical conductor leads 35 via a wire. The other one of the p-electrode and the n-electrode can be electrically coupled with, for example, a common interconnection provided on the mounting surfaces T. With such a configuration, each of the semiconductor laser elements LD sealed with the first sealing cover 30 can be independently driven by an external circuit. The semiconductor laser elements LD sealed with the first sealing cover 30 may be connected in series. In this case, it is sufficient to employ two electrical conductor leads 35.

Likewise, 11 semiconductor laser elements LD are held inside the second sealing cover 60. The number of semiconductor laser elements LD held inside the second sealing cover 60 may be different from the number of semiconductor laser elements LD held inside the first sealing cover 30. One surface of the lateral wall 62 of the second sealing cover 60 has a thicker portion 66. The thicker portion 66 has 11 holes arranged along the first direction (the positive direction of the X axis), and 11 electrical conductor leads 65 are provided so as to penetrate through the holes. In the present embodiment, the shape of the first sealing cover 30 and the second sealing cover 60 is symmetrical about the XY plane. The material and dimensions of the second sealing cover 60 may be equal to those of the first sealing cover 30. One of the p-electrode and the n-electrode of each of the semiconductor laser elements LD can be electrically coupled with a corresponding one of the electrical conductor leads 65 via a wire. The other one of the p-electrode and the n-electrode can be electrically coupled with, for example, a common interconnection provided on the mounting surfaces T. With such a configuration, each of the semiconductor laser elements LD sealed with the second sealing cover 60 can be independently driven by an external circuit. The semiconductor laser elements LD sealed with the second sealing cover 60 may be connected in series. In this case, it is sufficient to provide two electrical conductor leads 65.

In the present embodiment, as previously described, the support base 10 includes the first portion 10A, the second portion 10B, the third portion 10C and the fourth portion 10D (see FIG. 11). The first portion 10A resides in a space sealed with the first sealing cover 30. The second portion 10B resides in a space sealed with the second sealing cover 60. The third portion 10C resides between the first portion 10A and the second portion 10B. The first groove 16 is present between the third portion 10C and the first portion 10A. The second groove 18 is present between the third portion 10C and the second portion 10B. The first groove 16 and the second groove 18 formed in the mounting surfaces T reach the upper surface of the fourth portion 10D. The width in the z direction of each of the first groove 16 and the second groove 18 is in the range of, for example, not less than 0.2 mm and not more than 5 mm.

According to the present embodiment, two sealing covers, the first sealing cover 30 and the second sealing cover 60, separately seal the first portion 10A and the second portion 10B of the support base 10. Therefore, the volume of the space for sealing can be reduced as compared with a case in which these portions are sealed in a single space, so that the hermetically sealed condition can be easily maintained. Thus, the optical dust-attracting effect can be reduced.

The fourth portion 10D of the support base 10 is a base plate supporting the first portion 10A, the second portion 10B and the third portion 10C. The fourth portion 10D can function as a heat sink. The fourth portion 10D has a pair of fluid channels 72 running under the first portion 10A and the second portion 10B along the first direction (the positive direction of the X axis). Cooling water flowing through the fluid channels 72 can improve the function of the support base 10 as a heat sink.

As shown in FIG. 12, the first portion 10A has the upper surface (the first region 11 of the mounting surfaces T) in the form of stairs. Likewise, the second portion 10B has the upper surface (the third region 13 of the mounting surfaces T) in the form of stairs. The third portion 10C has the upper surface (the second region 12 of the mounting surfaces T) in the form of stairs. The fourth portion 10D has a flat upper surface on which the first portion 10A, the second portion 10B and the third portion 10C are placed. The upper surface of the fourth portion 10D is bonded to the lower end of the lateral wall 32 of the first sealing cover 30 and the lower end of the lateral wall 62 of the second sealing cover 60. The largeness of the steps of the mounting surfaces T (i.e., the difference in height of adjoining mounting surfaces T) can be in the range of, for example, not less than 0.2 mm and not more than 1 mm.

Preferably, the first portion 10A, the second portion 10B, the third portion 10C and the fourth portion 10D are each made of a material of high thermal conductivity. All of these portions may be made of the same material. Alternatively, a structure in which only the fourth portion 10D are made of a different material from the other portions 10A, 10B, 10C may be employed. Preferably, all of the first portion 10A, the second portion 10B, the third portion 10C and the fourth portion 10D are made of the same material. In this case, separation of the portions from one another, which is attributed to the difference in thermal expansion coefficient, can be reduced.

In the present embodiment, the first portion 10A, the second portion 10B and the third portion 10C are bonded to the fourth portion 10D. This bonding may be realized via a bonding material such as alloy or may be realized by welding. The support base 10 that includes these portions 10A, 10B, 10C and 10D may be an integral part produced by processing a single material. For example, the support base 10 may be an integral part produced by processing a single block of material. Preferably, the first portion 10A, the second portion 10B, the third portion 10C and the fourth portion 10D are in the form of an integral part. In this case, the thermal resistance can be reduced, and the heat produced during the operation of the semiconductor laser elements LD can be efficiently dissipated, as compared with a case in which the portions are bonded together.

The semiconductor laser device 300 includes a table 80 to which the optical fiber 40, the condenser lens 42 (the fast-axis condenser lens 42a and the slow-axis condenser lens 42b), the mirror 44, the half-wave plate 46, and the beam combiner 48 are secured. The optical fiber 40 is secured to a supporting portion 40S that is secured to the table 80. The table 80 is secured to the fourth portion 10D of the support base 10. The half-wave plate 46 is provided at a position on the table 80 between the mirror 44 and the beam combiner 48.

<Direct Diode Laser Device>

Figure 14:
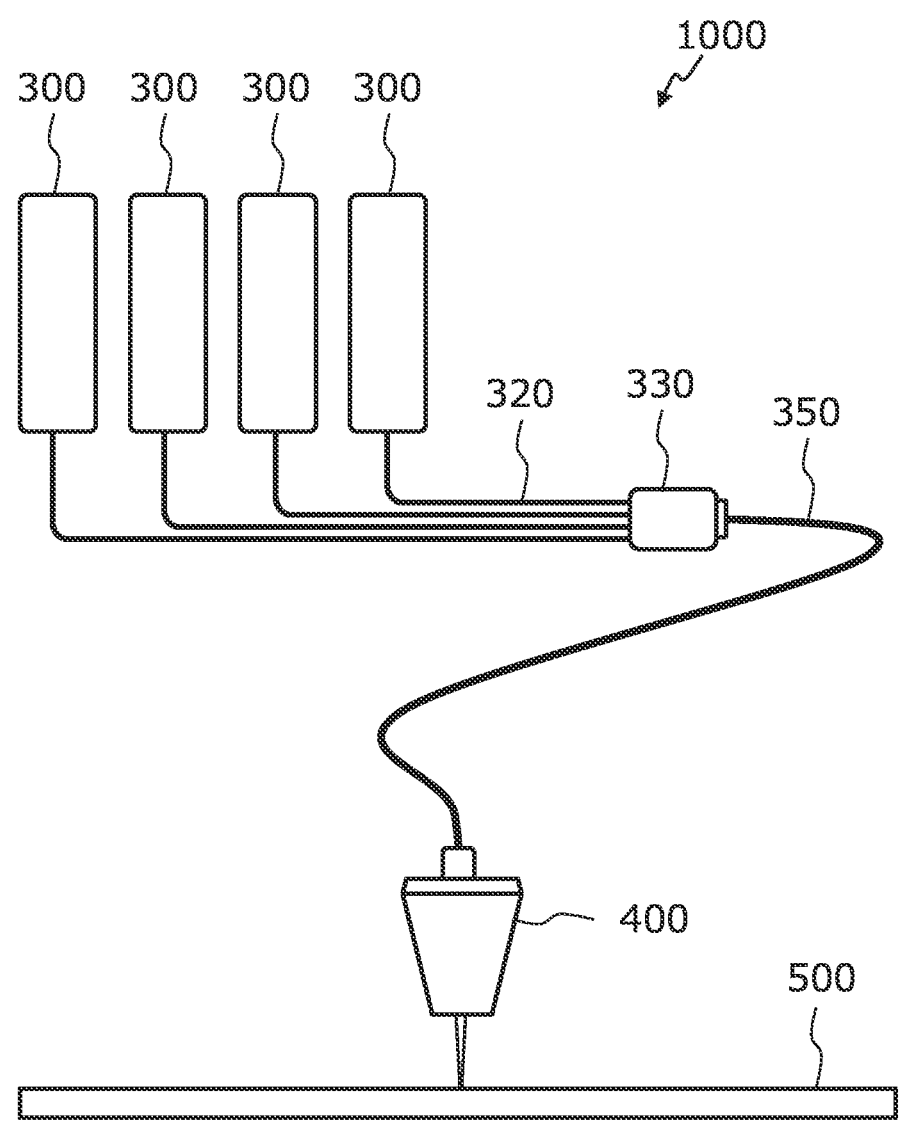
FIG. 14 is a diagram showing a configuration example of a direct diode laser (DDL) device that includes semiconductor laser devices of the present disclosure.

Next, a configuration example of a direct diode laser (DDL) device that includes the semiconductor laser devices 300 of the third embodiment is described with reference to FIG. 14. FIG. 14 is a diagram showing a configuration example of the DDL device 1000.

The DDL device 1000 shown in the drawing includes four semiconductor laser devices 300, a processing head 400, and an optical transmission fiber 350 that connects the semiconductor laser devices 300 to the processing head 400. The DDL device 1000 includes one or a plurality of semiconductor laser devices 300, and the number of semiconductor laser devices 300 is not limited to four.

Each of the semiconductor laser modules 300 has the same configuration as that previously described. The number of semiconductor laser elements mounted in each of the semiconductor laser devices 300 is not particularly limited but determined in accordance with required light output or irradiance. The wavelength of the laser light radiated from each of the semiconductor laser elements can also be selected in accordance with the material to be processed. For example, in the case in which copper, brass, aluminum or the like is to be processed, semiconductor laser elements whose central wavelength is in the range of equal to or higher than 350 nm and equal to or lower than 550 nm can be suitably employed. Laser light radiated from the semiconductor laser elements do not need to have an equal wavelength. Laser light at different central wavelengths may be superposed. The effects of the present invention can also be achieved in the case of using laser light whose central wavelength is outside the range of equal to or higher than 350 nm and equal to or lower than 550 nm.

In the illustrated example, optical fibers 320 extending from the plurality of semiconductor laser devices 300 are coupled to the optical transmission fiber 350 via an optical coupler 330. The optical coupler 330 can be, for example, a TFB (Tapered Fiber Bundle). The processing head 400 converges laser beams outgoing from the leading ends of the optical fibers 320 and irradiates a target object 500 with the converged laser beam. Now, assume that a single DDL device 1000 includes M semiconductor laser devices 300, and each of the semiconductor laser devices 300 includes N semiconductor laser elements.

When the light output of a single semiconductor laser element is P watts, a laser beam whose maximum light output is P×N×M watts can be converged on the target object 500. Herein, N is an integer equal to or greater than 2, and M is a positive integer. For example, when P=10 watts, N=22, and M=12, the light output realized exceeds 2.5 kilowatts.

According to the present embodiment, the semiconductor laser elements in a semiconductor laser device are sealed with a sealing cover and, therefore, the decrease in light output, which is caused by the optical dust-attracting effect or the like, is reduced so that the reliability can improve. Moreover, a limited space can be filled with a large number of collimated beams having a small beam diameter.

Thus, a high light output can be attained with a small-sized device, and coupling to an optical fiber is easy.

<Fiber Laser Device>

Figure 15:
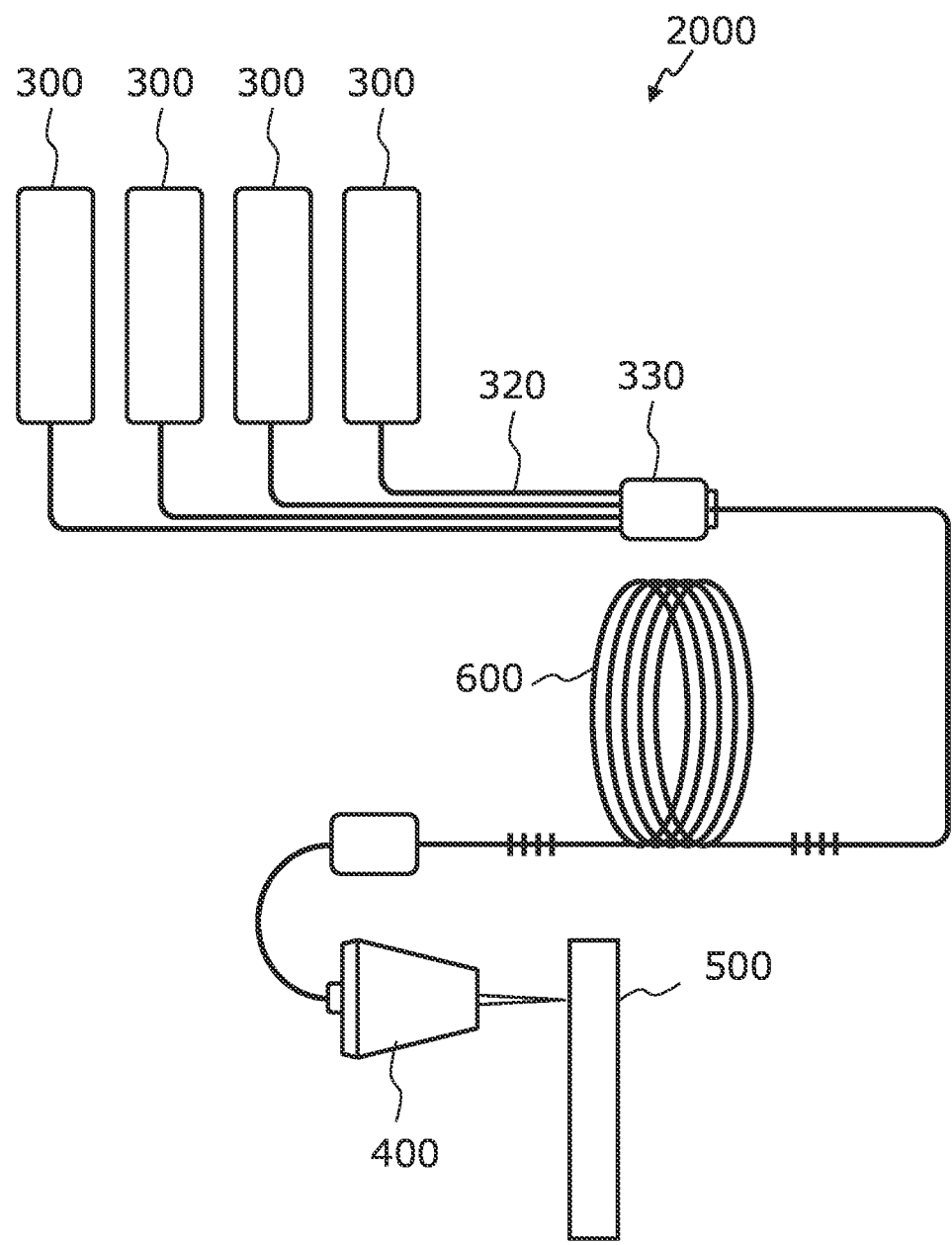
FIG. 15 is a diagram showing a configuration example of a fiber laser device that includes semiconductor laser devices of the present disclosure.

Next, a configuration example of a fiber laser device that includes the semiconductor laser devices 300 of a third embodiment is described with reference to FIG. 15. FIG. 15 is a diagram showing a configuration example of the fiber laser device 2000.

The fiber laser device 2000 shown in the drawing includes semiconductor laser devices 300 that function as pumping light sources and a rare earth-doped optical fiber 600 that can be optically excited by pumping light emitted from the semiconductor laser devices 300. In the illustrated example, optical fibers 320 extending from the plurality of semiconductor laser devices 300 are coupled to the rare earth-doped optical fiber 600 via an optical coupler 330. The rare earth-doped optical fiber 600 is located between a pair of fiber Bragg gratings that define a resonator. In the case in which the rare earth-doped optical fiber 600 is doped with ytterbium (Yb) ions, the semiconductor laser devices 300 used can generate pumping light at the wavelength of, for example, 915 nm. In the case in which the rare earth-doped optical fiber 600 used is made of, for example, fluoride glass doped with praseodymium (Pr), visible-light laser oscillation can be realized with blue pumping light. The semiconductor laser modules 300 of the present embodiment of the present disclosure are useful as such a pumping light source. In the semiconductor laser modules 300 of the present embodiment of the present disclosure, a plurality of semiconductor laser elements are held in a space hermetically sealed with a sealing cover. Therefore, as previously described, particularly when using semiconductor laser elements configured to emit blue or green laser light, particularly great effects can be obtained.

The processing head 400 converges a laser beam outgoing from the leading end of the rare earth-doped optical fiber 600 and irradiates a target object 500 with the converged laser beam.

A semiconductor laser device of the present disclosure can be used particularly for combining a plurality of laser beams so as to realize a high-power laser beam. A semiconductor laser device of the present disclosure can be used in fields of industry where high-power laser light sources are needed, e.g., cutting or punching of various materials, local heat treatments, surface treatments, metal welding, 3D printing, and so on. Furthermore, a semiconductor laser device of the present disclosure can also be used for applications other than DDL devices, e.g., as a pumping light source of a fiber laser device.

What is claimed is:

1. A semiconductor laser device comprising:
   a support base having a plurality of mounting surfaces arranged in a first direction, wherein heights of the mounting surfaces from a reference plane that is parallel to the first direction decrease stepwise or gradually along the first direction;
   a first semiconductor laser element directly or indirectly secured to a first mounting surface among the plurality of mounting surfaces, the first semiconductor laser element being configured to emit first laser light in a second direction that intersects the first direction in a plan view from a direction normal to the reference plane;
   a second semiconductor laser element directly or indirectly secured to a second mounting surface among the plurality of mounting surfaces, the second semiconductor laser element being configured to emit second laser light in the second direction in the plan view;
   a first slow-axis collimator lens directly or indirectly secured to the first mounting surface, the first slow-axis collimator lens being located at a position at which the first laser light is incident;
   a second slow-axis collimator lens directly or indirectly secured to the second mounting surface, the second slow-axis collimator lens being located at a position at which the second laser light is incident; and
   a first sealing cover having a lateral wall surrounding the first semiconductor laser element and the second semiconductor laser element, wherein a lower end of the lateral wall is bonded to the support base, wherein the first sealing cover defines an inner space in which the first semiconductor laser element and the second semiconductor laser element are held, and wherein the first sealing cover has a light-transmitting region configured to transmit the first laser light and the second laser light, wherein:

each of the plurality of mounting surfaces includes a first region covered with the first sealing cover and a second region located outside the first sealing cover;
the support base has a first groove receiving at least part of the lateral wall of the first sealing cover,
a part or an entirety of the lower end of the lateral wall of the first sealing cover is bonded to a bottom surface of the first groove, and
a part of the first groove is located in the plurality of mounting surfaces at a position between the first and second semiconductor laser elements and the first and second slow-axis collimator lenses.

2. The semiconductor laser device of claim 1, wherein, in each of the plurality of mounting surfaces, a height of the first region from the reference plane is equal to a height of the second region from the reference plane.

3. The semiconductor laser device of claim 1, further comprising:
a first fast-axis collimator lens located at a position between the first semiconductor laser element and the first slow-axis collimator lens at which the first laser light emitted from the first semiconductor laser element is incident, and
a second fast-axis collimator lens located at a position between the second semiconductor laser element and the second slow-axis collimator lens at which the second laser light emitted from the second semiconductor laser element is incident.

4. The semiconductor laser device of claim 3, wherein:
the first fast-axis collimator lens and the second fast-axis collimator lens are located inside the first sealing cover, and
the first slow-axis collimator lens and the second slow-axis collimator lens are located outside the first sealing cover.

5. The semiconductor laser device of claim 4, further comprising:
a first submount supporting the first semiconductor laser element, and
a second submount supporting the second semiconductor laser element, wherein:
the first submount comprises a first lens supporting member supporting the first fast-axis collimator lens, and
the second submount comprises a second lens supporting member supporting the second fast-axis collimator lens.

6. The semiconductor laser device of claim 1, further comprising:
a beam combining section configured to combine the first laser light outgoing from the first slow-axis collimator lens and the second laser light outgoing from the second slow-axis collimator lens, wherein:
the beam combining section comprises:
a first mirror located in the second region of the first mounting surface and configured to reflect the first laser light in the first direction,
a second mirror located in the second region of the second mounting surface and configured to reflect the second laser light in the first direction, and
a condenser lens configured to couple the first laser light reflected by the first mirror and the second laser light reflected by the second mirror with an optical fiber.

7. The semiconductor laser device of claim 6, further comprising:
a third semiconductor laser element directly or indirectly secured to the first mounting surface, the third semiconductor laser element being configured to emit third laser light in a direction opposite to the second direction in the plan view,
a fourth semiconductor laser element directly or indirectly secured to the second mounting surface, the fourth semiconductor laser element being configured to emit fourth laser light in a direction opposite to the second direction in the plan view,
a third slow-axis collimator lens directly or indirectly secured to the first mounting surface, the third slow-axis collimator lens being located at a position at which the third laser light is incident,
a fourth slow-axis collimator lens directly or indirectly secured to the second mounting surface, the fourth slow-axis collimator lens being located at a position at which the fourth laser light is incident, and
a second sealing cover having a lateral wall surrounding the third semiconductor laser element and the fourth semiconductor laser element, wherein a lower end of the lateral wall is bonded to the support base, wherein the second sealing cover defines an inner space in which the third semiconductor laser element and the fourth semiconductor laser element are held, and wherein the second sealing cover has a light-transmitting region configured to transmit the third laser light and the fourth laser light,
wherein each of the plurality of mounting surfaces comprises a third region covered with the second sealing cover, and
wherein the second region is located between the first region and the third region.

8. The semiconductor laser device of claim 7 wherein, in each of the plurality of mounting surfaces, a height of the third region from the reference plane is equal to a height of the second region from the reference plane.

9. The semiconductor laser device of claim 7, wherein:
the beam combining section is configured to combine the first laser light outgoing from the first slow-axis collimator lens, the second laser light outgoing from the second slow-axis collimator lens, the third laser light outgoing from the third slow-axis collimator lens, and the fourth laser light outgoing from the fourth slow-axis collimator lens,
the beam combining section comprises:
a third mirror located in the second region of the first mounting surface and configured to reflect the third laser light in the first direction, and
a fourth mirror located in the second region of the second mounting surface and configured to reflect the fourth laser light in the first direction, and
the condenser lens is configured to couple the third laser light reflected by the third mirror and the fourth laser light reflected by the fourth mirror with the optical fiber.

10. The semiconductor laser device of claim 7, further comprising:
a third fast-axis collimator lens located at a position between the third semiconductor laser element and the third slow-axis collimator lens at which the third laser light emitted from the third semiconductor laser element is incident, and
a fourth fast-axis collimator lens located at a position between the fourth semiconductor laser element and the fourth slow-axis collimator lens at which the fourth laser light emitted from the fourth semiconductor laser element is incident.

11. The semiconductor laser device of claim 10, wherein:
the third fast-axis collimator lens and the fourth fast-axis collimator lens are located inside the second sealing cover, and
the third slow-axis collimator lens and the fourth slow-axis collimator lens are located outside the second sealing cover.

12. The semiconductor laser device of claim 10, further comprising:
a third submount supporting the third semiconductor laser element, and
a fourth submount supporting the fourth semiconductor laser element, wherein:
the third submount comprises a third lens supporting member supporting the third fast-axis collimator lens, and
the fourth submount comprises a fourth lens supporting member supporting the fourth fast-axis collimator lens.

13. The semiconductor laser device of claim 7, wherein:
the support base has a second groove receiving at least part of the lateral wall of the second sealing cover, and
a part or an entirety of the lower end of the lateral wall of the second sealing cover is bonded to a bottom surface of the second groove, wherein:
a part of the second groove is located in the plurality of mounting surfaces at a position between the third and fourth semiconductor laser elements and the third and fourth slow-axis collimator lenses.

14. The semiconductor laser device of claim 7, wherein the first semiconductor laser element, the second semiconductor laser element, the third semiconductor laser element and the fourth semiconductor laser element are configured to oscillate laser light of any of green light, blue light, or violet light.

15. The semiconductor laser device of claim 1, wherein, the part of the bottom surface of the first groove extends in the first direction parallel to the reference plane.

16. The semiconductor laser device of claim 1, wherein, a height of the part of the bottom surface of the first groove from the reference plane is constant along the first direction.

* * * * *